(12) United States Patent
Nakao et al.

(10) Patent No.: US 10,601,646 B2
(45) Date of Patent: Mar. 24, 2020

(54) COMMUNICATION SYSTEM, METHOD OF SETTING CONFIGURATION INFORMATION, AND ELECTRONIC APPARATUS

(71) Applicant: Ricoh Company, Ltd., Tokyo (JP)

(72) Inventors: Ryohji Nakao, Kanagawa (JP); Hiroki Ozaki, Tokyo (JP)

(73) Assignee: RICOH COMPANY, LTD, Tokyo (JP)

( * ) Notice: Subject to any disclaimer, the term of this patent is extended or adjusted under 35 U.S.C. 154(b) by 50 days.

(21) Appl. No.: 16/047,349

(22) Filed: Jul. 27, 2018

(65) Prior Publication Data

US 2019/0036769 A1 Jan. 31, 2019

(30) Foreign Application Priority Data

Jul. 28, 2017 (JP) .................................. 2017-147258

(51) Int. Cl.
*G06F 15/16* (2006.01)
*H04L 12/24* (2006.01)
*G06F 9/445* (2018.01)

(52) U.S. Cl.
CPC ...... *H04L 41/0803* (2013.01); *G06F 9/44505* (2013.01)

(58) Field of Classification Search
CPC .................. H04L 41/0803; G06F 9/44505
See application file for complete search history.

(56) References Cited

U.S. PATENT DOCUMENTS

| 5,655,148 A | 8/1997 | Richman et al. |
| 7,353,263 B2 * | 4/2008 | Morikawa ........... H04L 41/0843 709/201 |

(Continued)

FOREIGN PATENT DOCUMENTS

| JP | 2016-177796 | 10/2016 |
| JP | 2017-005683 | 1/2017 |

OTHER PUBLICATIONS

Rho, S., et al., "Configuring Requirements-Compliant Multi-agent Systems", IEEE, XP10835040A, Aug. 30, 2005, pp. 58-65.

*Primary Examiner* — Moustafa M Meky
(74) *Attorney, Agent, or Firm* — Xsensus LLP

(57) ABSTRACT

A communication system includes a first electronic apparatus, and a second electronic apparatus communicable with each other. The first electronic apparatus includes first circuitry configured to transmit first configuration information to the second electronic apparatus. The second electronic apparatus includes second circuitry including at least a first information reception interface and a second information reception interface. The second circuitry receives the first configuration information from the first electronic apparatus via the first information reception interface, receives second configuration information via the second information reception interface, refers to priority information indicating a priority order set for the first information reception interface and the second information reception interface, and determines which of the first configuration information received from the first electronic apparatus via the first information reception interface and the second configuration information received via the second information reception interface is to be discarded or stored based on the priority order set.

9 Claims, 26 Drawing Sheets

(56) References Cited

U.S. PATENT DOCUMENTS

| | | | |
|---|---|---|---|
| 9,020,993 B2 * | 4/2015 | Hahn | G06F 16/1737 |
| | | | 707/827 |
| 2001/0054096 A1 * | 12/2001 | Morikawa | H04L 41/0843 |
| | | | 709/223 |
| 2011/0258241 A1 * | 10/2011 | Raines | G06F 16/1737 |
| | | | 707/816 |
| 2014/0376878 A1 | 12/2014 | Nakamura et al. | |
| 2014/0379751 A1 | 12/2014 | Nakamura et al. | |
| 2016/0080788 A1 | 3/2016 | Ozaki et al. | |
| 2016/0277608 A1 | 9/2016 | Shirai et al. | |
| 2017/0093930 A1 | 3/2017 | Ozaki | |
| 2017/0168808 A1 | 6/2017 | Kakei et al. | |
| 2018/0352488 A1 * | 12/2018 | Selvaganapathy | H04W 48/16 |

* cited by examiner

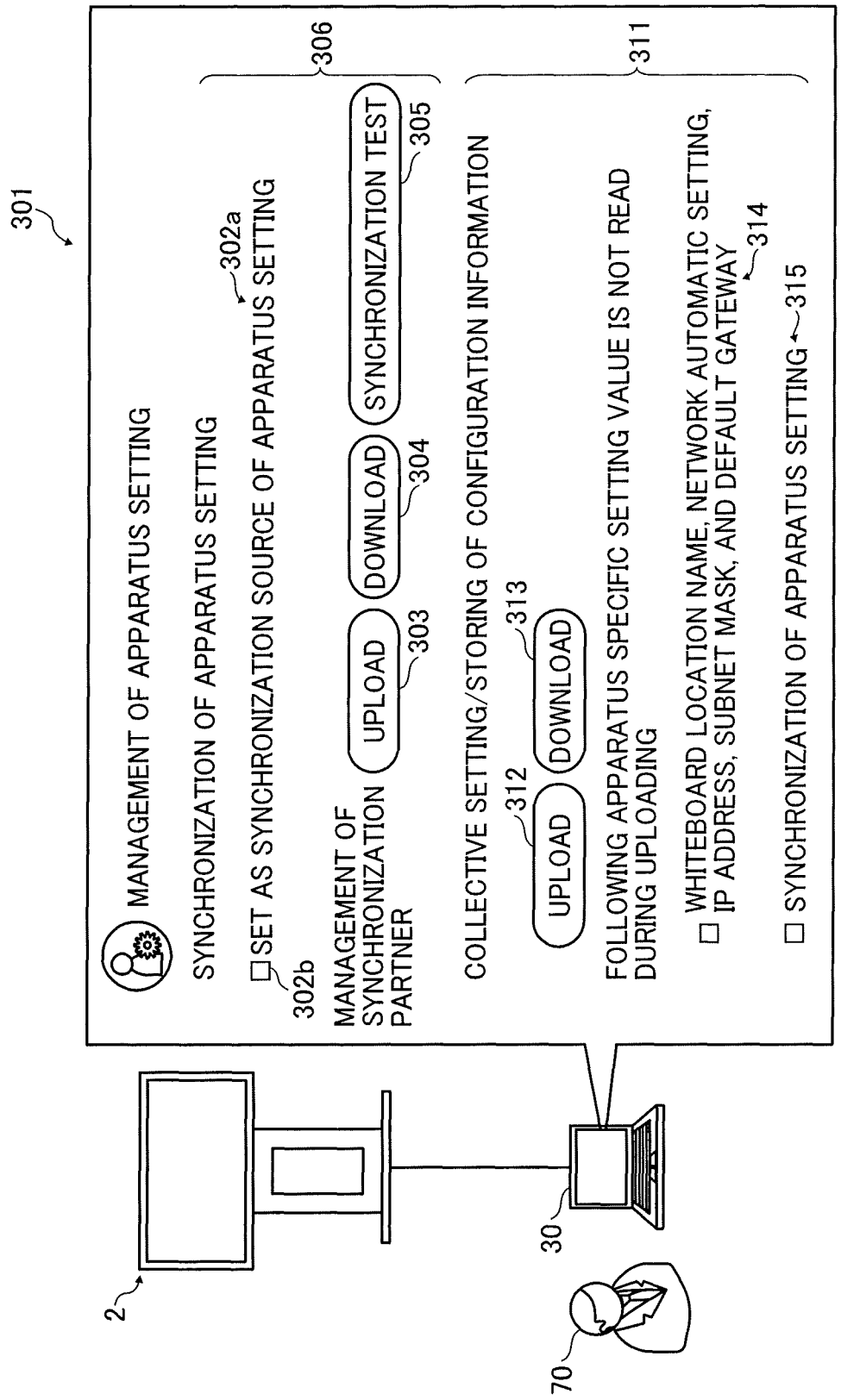

FIG. 12

```
<IWB SETTING ITEM>
 <MAIL SERVER>
  <SERVER/>
  <PORT>25</PORT>
 </MAIL SERVER >
 <APPARATUS NAME/>
 <SHUTDOWN TIME>5</SHUTDOWN TIME>
 <STANDBY TIME>30</STANDBY TIME>
 <SLEEP TIME>0</SLEEP TIME>
 <NETWORK>
  <DHCP>true</DHCP>
  <IP ADDRESS/>
  <SUBNET MASK/>
  <GATEWAY/>
 </NETWORK>
 <PRINT SETTING>
  <PRINTER ADDRESS/>
  <USER NAME/>
  <PASSWORD/>
 </PRINTER SETTING>

</IWB SETTING ITEM>
```

(WEB SETTING)

(UI SETTING)

(WEB SETTING)

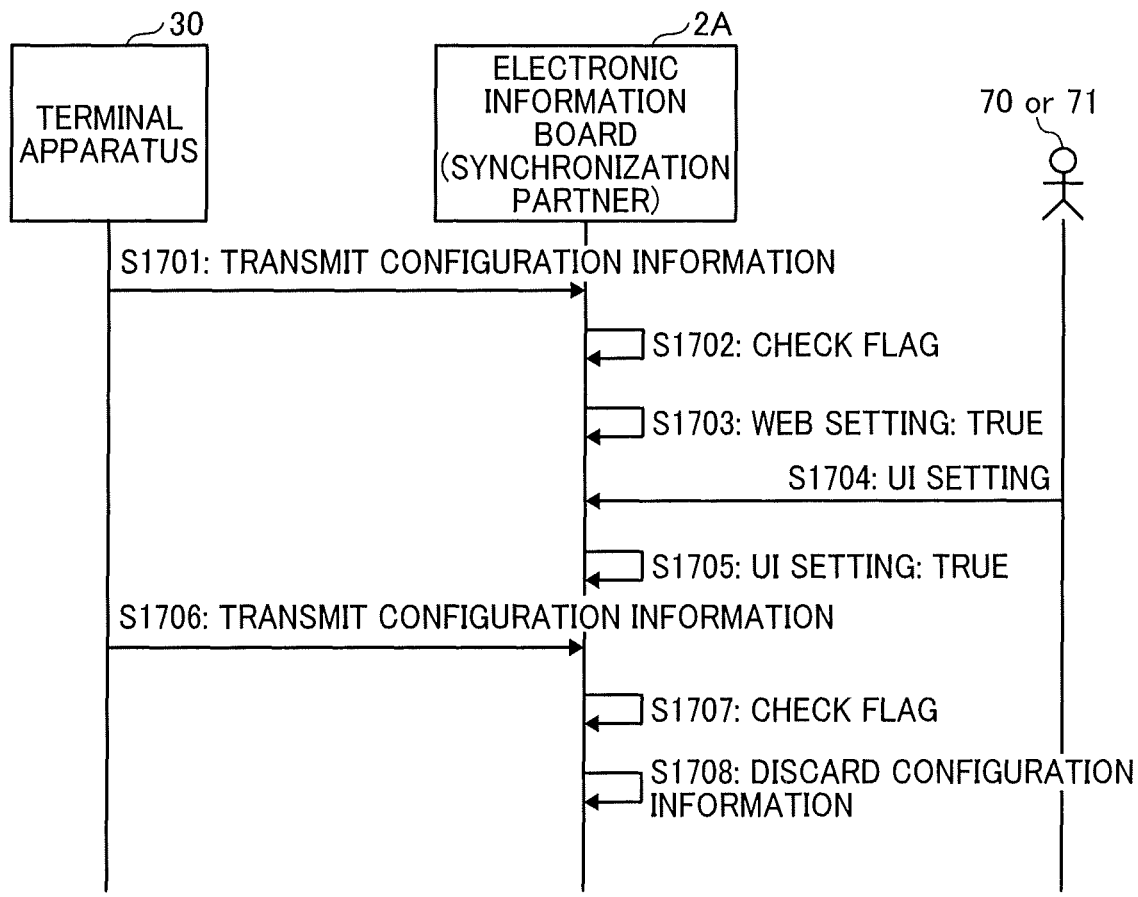

(UI SETTING → WEB SETTING → SYNCHRONIZATION SETTING)

(SYNCHRONIZATION SETTING → WEB SETTING → UI SETTING)

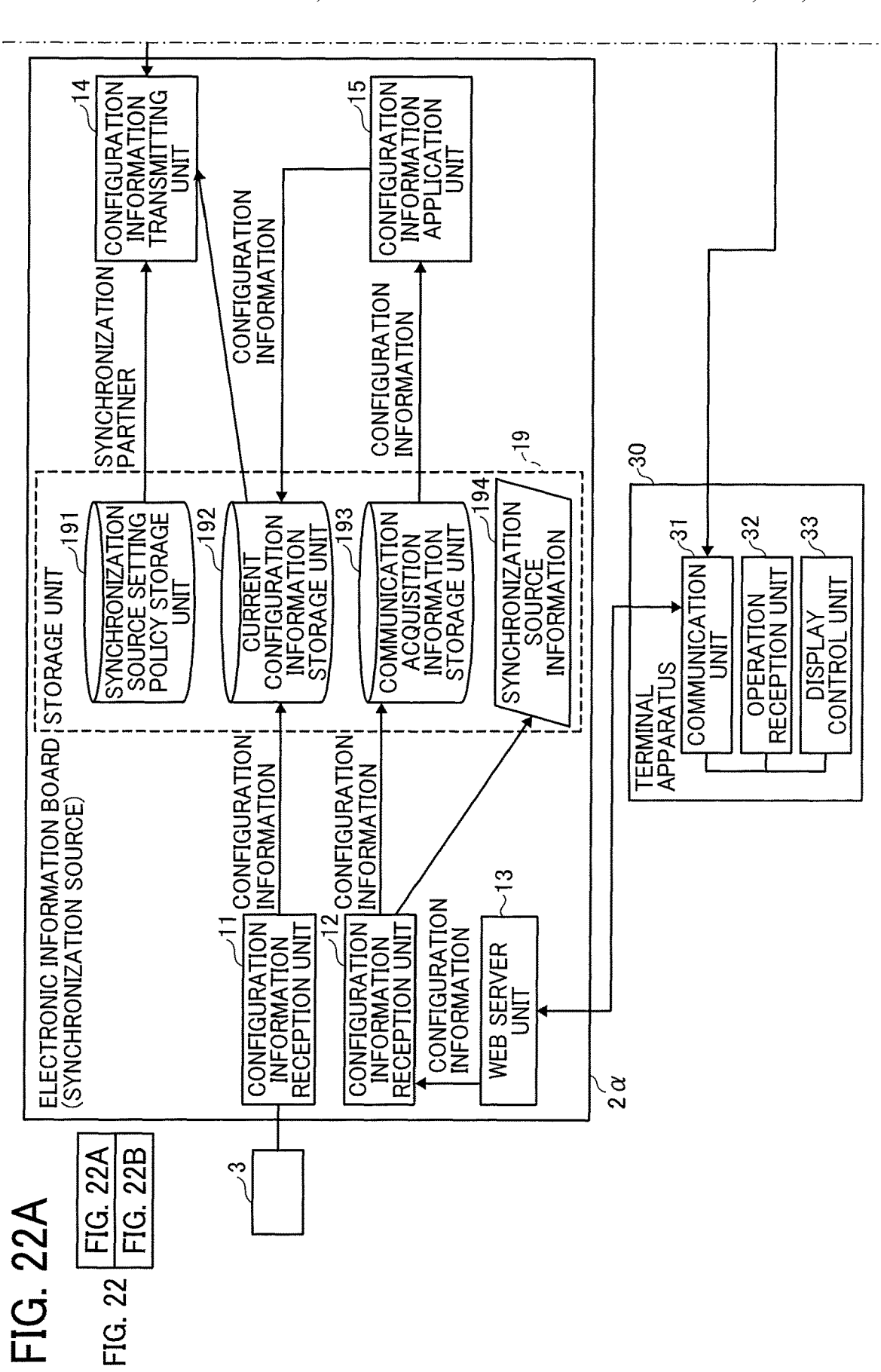

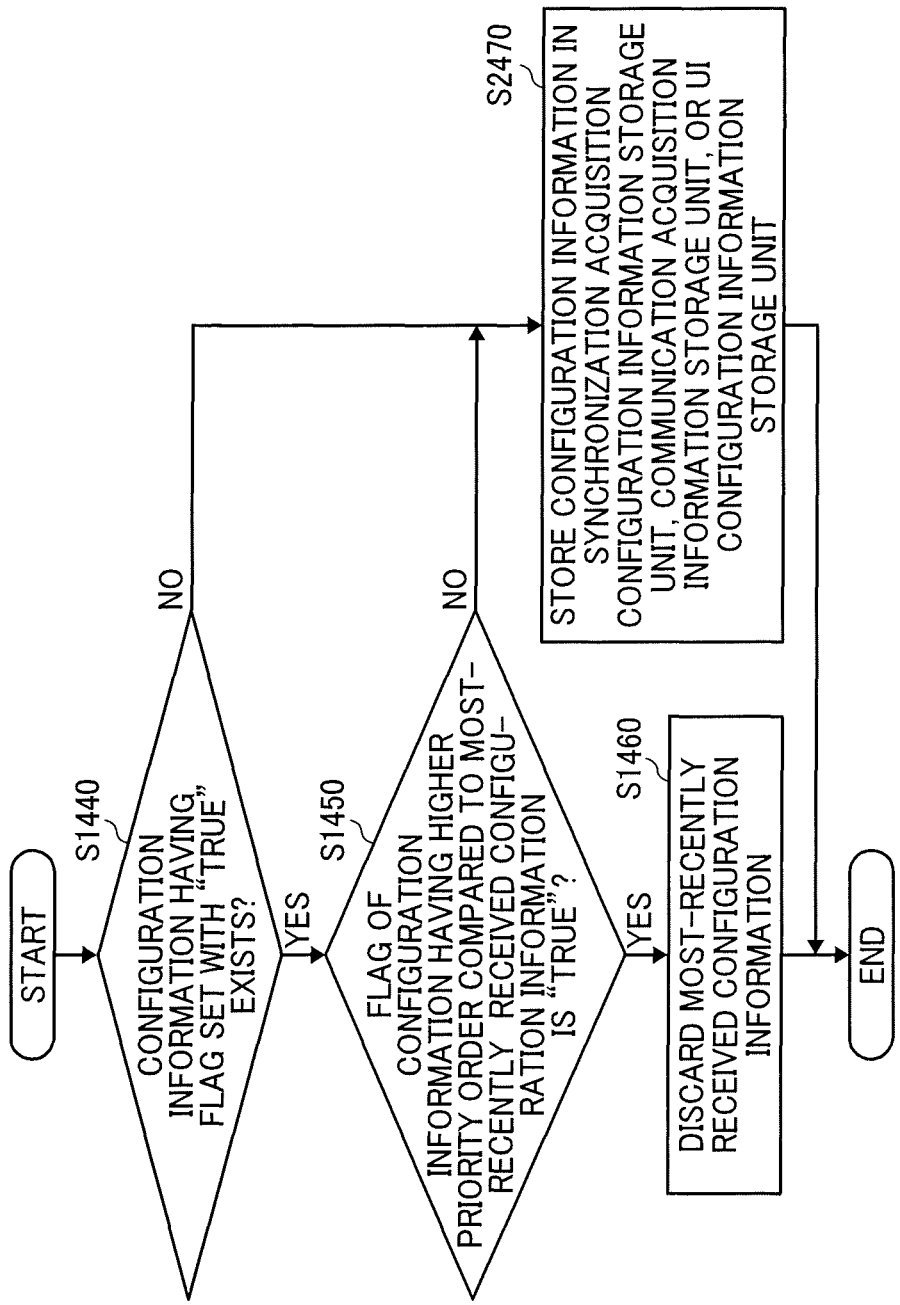

COMMUNICATION SYSTEM, METHOD OF SETTING CONFIGURATION INFORMATION, AND ELECTRONIC APPARATUS

CROSS-REFERENCE TO RELATED APPLICATION

This application claims priority pursuant to 35 U.S.C. § 119(a) to Japanese Patent Application No. 2017-147258, filed on Jul. 28, 2017, in the Japan Patent Office, the disclosure of which is incorporated by reference herein in its entirety.

BACKGROUND

Technical Field

This disclosure relates to a communication system, a method of setting configuration information, and an electronic apparatus.

Background Art

Electronic apparatuses used in offices have increased functional capabilities, causing an increase of setting items set by administrators of users such as customers or clients. For example, electronic apparatuses such as electronic information boards having a large flat panel display mounted with a touch panel are used in offices. The electronic information board displays a screen that serves as a writing panel, acquires trajectory of an electronic pen or a finger moving on the touch panel, and draws the trajectory on the screen as handwritten images. Therefore, users can use the screen like blackboards or whiteboards. As to functions of electronic apparatuses, administrators may set various settings.

In view of convenience of administrators, currently-available electronic apparatuses are configured to receive configuration information using a plurality of methods. For example, the configuration information can be transmitted to a plurality of electronic apparatuses from one server using a method of synchronization setting. Further, the configuration information can be set to the plurality of electronic apparatuses one by one using a user interface (UI) provided for each one of the electronic apparatuses.

As above described, since the configuration information can be set to each electronic apparatus using different methods, a technology to determine which configuration information is effectively set to each electronic apparatus is disclosed. If the configuration information is to be set to one electronic apparatus using different methods at the same time range, timing of setting the configuration information using one method and timing of setting the configuration information using another method are separated.

SUMMARY

In one aspect of the present invention, a communication system is devised. The communication system includes a first electronic apparatus, and a second electronic apparatus communicable with the first electronic apparatus. The first electronic apparatus includes first circuitry configured to transmit first configuration information stored in a first memory of the first electronic apparatus to the second electronic apparatus at a given timing. The second electronic apparatus includes second circuitry, including a plurality of information reception interfaces including at least a first information reception interface and a second information reception interface. The second circuitry receives the first configuration information from the first electronic apparatus via the first information reception interface, receives second configuration information via the second information reception interface, refers to priority information indicating a priority order set for the first information reception interface and the second information reception interface, and determines which of the first configuration information received from the first electronic apparatus via the first information reception interface and the second configuration information received via the second information reception interface is to be discarded or stored in a second memory of the second electronic apparatus based on the priority order set for the first information reception interface and the second information reception interface.

In another aspect of the present invention, a method of setting configuration information in an electronic apparatus is devised. The method includes receiving first configuration information from another electronic apparatus via a first information reception interface of the electronic apparatus, receiving second configuration information via a second information reception interface of the electronic apparatus, referring to priority information indicating a priority order set for the first information reception interface and the second information reception interface, and determining which of the first configuration information received from the another electronic apparatus via the first information reception interface, and the second configuration information received via the second information reception interface is to be stored in the electronic apparatus or discarded based on the priority order set for the first information reception interface and the second information reception interface.

In another aspect of the present invention, an electronic apparatus is devised. The An electronic apparatus includes circuitry, including at least a first information reception interface and a second information reception interface. The circuitry receives, via the first information reception interface, first configuration information from another electronic apparatus configured to transmit the first configuration information at a given timing, receives second configuration information via the second information reception interface, refers to priority information indicating a priority order set for the first information reception interface and the second information reception interface, and determines which of the first configuration information received from the another electronic apparatus via the first information reception interface, and the second configuration information received via the second information reception interface is to be stored in the electronic apparatus or discarded based on the priority order set for the first information reception interface and the second information reception interface.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 7 illustrates an example of a synchronization source setting screen displayed on a liquid crystal display (LCD) by a browser software of the terminal apparatus;

FIG. 12 illustrates an example of configuration information stored and transmitted by an electronic information board;

FIG. 17 illustrates an example of a sequence diagram of a procedure when an electronic information board in the communication system synchronizes configuration information (web setting→UI setting→web setting);

FIGS. 22A and 22B illustrate an example of a functional block diagram of an electronic information board used as a synchronization source, an electronic information board used as a synchronization partner, and a terminal apparatus of a second embodiment;

FIG. 24 illustrates an example of a flowchart illustrating a process when an electronic information board used as a synchronization partner receives configuration information in the second embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a communication system and a communication method performed by the communication system of one or more embodiment of the present invention with reference to drawings.

First Embodiment

Figure 1:
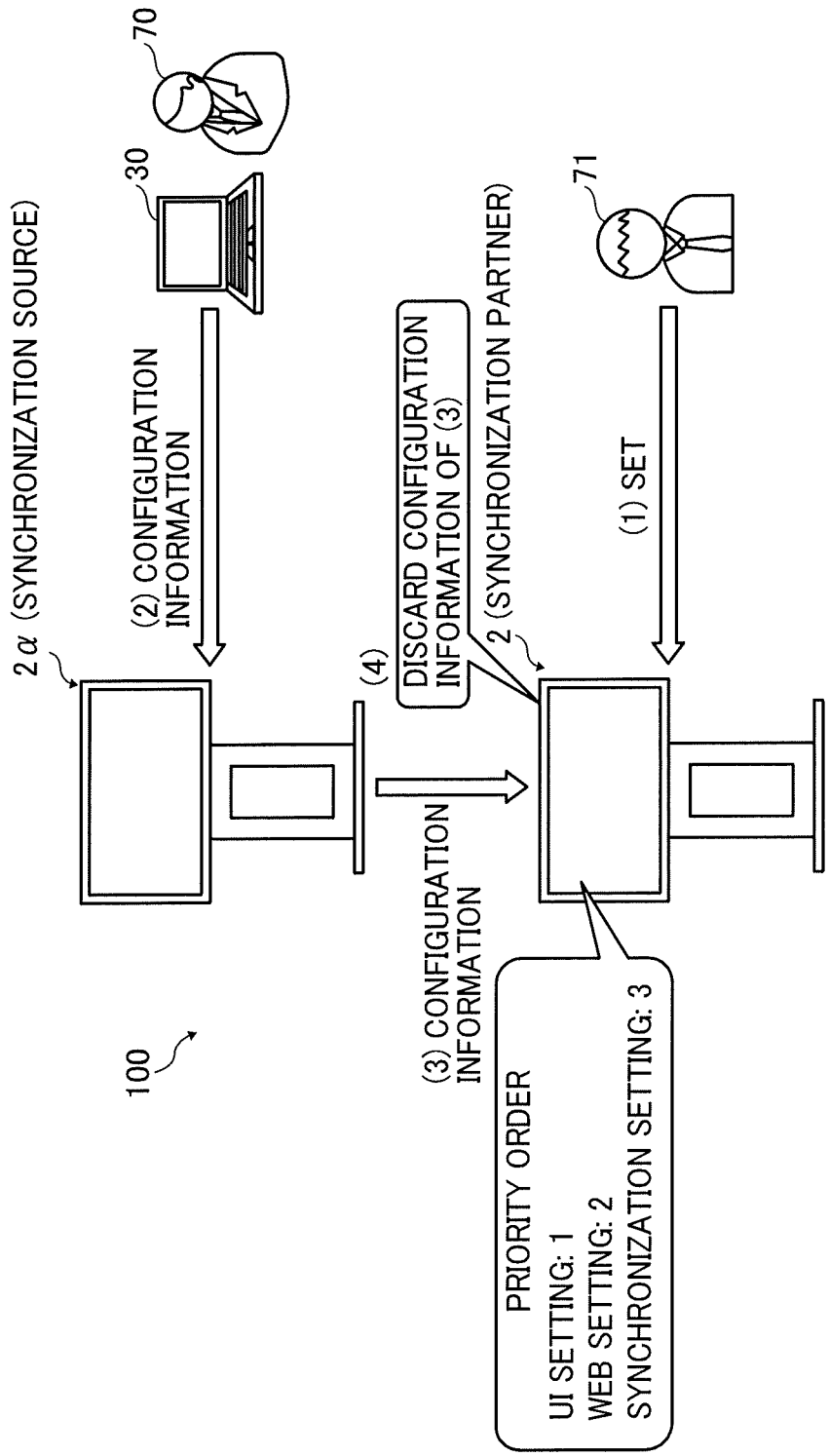
FIG. 1 illustrates an example of a scheme of synchronizing configuration information between two electronic apparatuses.

Synchronization of Configuration Information:

FIG. 1 illustrates an example of a scheme of synchronizing configuration information between two electronic apparatuses. FIG. 1 illustrates one case that one synchronization source and one synchronization partner connected with each other via a network or a communication line, in which an electronic information board 2α is used as the synchronization source and an electronic information board 2 is used as the synchronization partner. The synchronization partner may be also referred to as the synchronization destination because the configuration information set to the synchronization source is transmitted to the synchronization partner as the destination of configuration information. Hereinafter, the electronic information board 2 used as the synchronization partner may be referred to as the electronic information board 2 (synchronization partner), and the electronic information board 2 used as the synchronization source may be referred to as the electronic information board 2α (synchronization source). Typically, the number of the electronic information boards 2 used as the synchronization partner may be one or more. FIG. 1 illustrates an example case that one electronic information board 2 is used as the synchronization partner for the simplicity of description.

(1) First, when a user 71 is to use the electronic information board 2 to be synchronized (i.e., synchronization partner), the user 71 sets configuration information using a method of a user interface (UI) setting (hereinafter, this setting process is referred to as UI setting) for the electronic information board 2. The UI is a user interface, and the configuration information can be set by using a display and an input device, such as a touch panel, of the electronic information board 2. For example, the configuration information set by the UI setting is applied to the electronic information board 2 (synchronization partner) right after the setting.

(2) Then, an administrator 70 sets configuration information to the electronic information board 2α (synchronization source) using a terminal apparatus 30.

(3) The electronic information board 2α (synchronization source) transmits the configuration information to the electronic information board 2 (synchronization partner) at given synchronization timing (hereinafter, this setting process is referred to as synchronization setting).

(4) The electronic information board 2 (synchronization partner) maintains a priority order set for the UI setting, web setting, and synchronization setting to be described later. For example, the priority order is set from high to low in the order of UI setting, web setting, and synchronization setting. Since the electronic information board 2 (synchronization partner) maintains the configuration information set by the UI setting set with a higher priority order compared to the configuration information set by the synchronization setting set with a lower priority order, the electronic information board 2 (synchronization partner) discards the configuration information received by the synchronization setting set with the lower priority order.

Conventionally, the synchronization setting corresponding to the most-recent or latest setting, is set to the electronic information board 2 (synchronization partner) by reactivating the electronic information board 2 (synchronization partner). By contrast, as to the communication system 100 of the embodiments, since the configuration information set by the synchronization setting is discarded in some cases, the configuration information set by the UI setting is being applied even if the electronic information board 2 is reactivated. Therefore, as to the communication system 100 of the embodiments, the configuration information that is received as the latest configuration information is not simply applied to the electronic information board 2, but the configuration information can be applied to the electronic information board 2 based on the priority order set for information reception units or information reception interfaces that receive the configuration information, to be disclosed in this disclosure.

Terms:

The configuration information means various settings set for the electronic information board 2, with which the electronic information board 2 performs various operations. The configuration information may be also referred to as the setting information. For example, the configuration information includes settings for effectively operating the electronic information board 2, settings for communicating with the Internet and other devices via a network, settings matched to preferences of users, settings for allowing or limiting operations of the electronic information board 2, and settings of ON/OFF control of each function.

The administrator 70 is a person who sets the configuration information to the electronic information boards, and is also called as a user or a person in charge. The synchronization setting and the web setting may be performed mainly by the administrator 70, and the UI setting may be performed by the user 71, but the synchronization setting and the web setting can be performed by the user 71, and the UI setting can be performed by the administrator 70.

The information reception unit of configuration information means a specific means or method for setting the configuration information in the electronic information board 2. The information reception unit may be also referred to as the information reception interface. For example, the information reception unit of configuration information means a route, path, or interface used for setting the configuration information in the electronic information board 2, and means a method for setting the configuration information in the electronic information board 2. In this disclosure, the UI setting, the web setting, and the synchronization setting are described as the information reception units or information reception interfaces that receive the configuration information.

The reception of configuration information means that a user, such as the administrator 70, sets the configuration information to the electronic information board 2. When viewed from the electronic information board 2, the reception of configuration information means that the configuration information is acquired, received, or set in the electronic information board 2.

Figure 2:
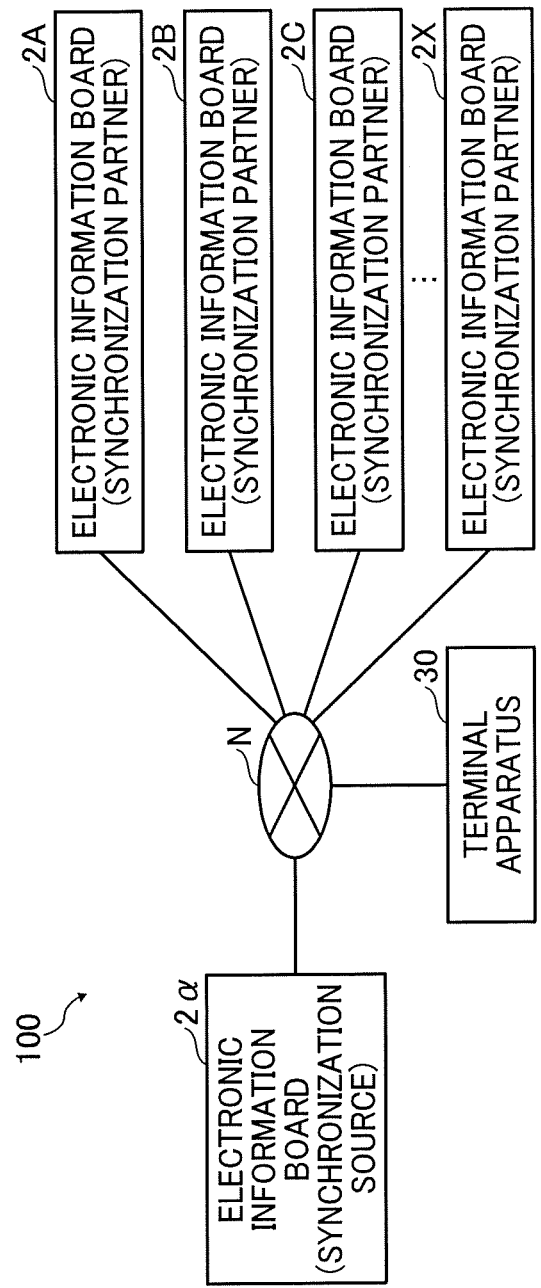
FIG. 2 illustrates an example of a schematic configuration of a communication system of an embodiment.

Configuration of Communication System:

FIG. 2 illustrates an example of a schematic configuration of the communication system 100 of the embodiment. As illustrated in FIG. 2, the communication system 100 includes, for example, the electronic information board 2α (synchronization source), one or more electronic information boards 2 (synchronization partner), and the terminal apparatus 30 connected with each other via a network wirelessly and/or by wire. Since the terminal apparatus 30 is used to communicate with the electronic information board 2α and the electronic information board 2 to set and check the configuration information, the terminal apparatus 30 can be omitted in some cases.

The communication system 100 may be referred to as an apparatus system because electronic apparatuses such as the electronic information boards 2 communicate with each other. The communication system 100 may be also referred to as an image processing system or an information processing system. The name of system may be changed as needed depending on the electronic apparatuses used in the communication system 100. For example, if the electronic apparatuses used in the communication system 100 are electronic information boards, the communication system 100 may be referred to as an electronic information board system, and if the electronic apparatuses used in the communication system 100 are multifunctional apparatuses, the communication system 100 may be referred to as a multifunctional apparatus system.

The network N is, for example, an in-house local area network (LAN), but can include a wide area Ethernet (registered trademark). The network N may also include the Internet. For example, the network N can use a virtual private network (VPN) to connect electronic information boards at branch offices and overseas for communicating with each other. The network N may be a wired network, a wireless network, or a combination of wired and wireless information. Further, in addition to the network N, apparatuses can be connected by dedicated lines such as universal serial bus (USB) cable. Further, apparatuses can use the short-range communication such as Bluetooth (registered trademark) for communicating with each other.

The electronic information board 2 has a large display including a touch panel to detect coordinates on the panel face pointed by a user and connect the detected coordinates to display a stroke. In addition, an image generated by a personal computer (PC) connected to or communicable with the electronic information board 2 can be displayed on the display of the electronic information board 2, and a stroke can be synchronized between two or more electronic information boards 2 located at different locations by communicating with each other. The electronic information board may be also referred to as an electronic blackboard or an electronic whiteboard.

The electronic information board 2 has a function of an information processing apparatus as indicated in a hardware block diagram to be described later. Further, although the electronic information board 2 is described in this disclosure, the synchronization method described in this disclosure can be applied to any electronic apparatuses that can synchronize the configuration information. For example, the synchronization method described in this disclosure can be applied to image forming apparatuses (e.g., copiers, printers, scanners, multifunctional peripherals (MFPs), network cameras (e.g., all-weather camera, omnidirectional camera), production printing machines (e.g., commercial printing machine), projectors, teleconference terminals, and the like. Further, the synchronization method described in this disclosure can be also applied to game machines, head-mounted displays, car navigations, digital cameras, drones, and the like.

The electronic information board 2α used as the synchronization source, and the electronic information boards 2 used as the synchronization partner may be, for example, manufactured by the same manufacturer, and the models of electronic information board may be the same or different. For example, the synchronization method described in this disclosure can be applied to electronic information boards having the same product name, electronic information boards having the same product name and different release date, or electronic information boards having different product names. The synchronization method described in this disclosure can be applied to various electronic information boards that can synchronize the configuration information even if hardware resources are different among the electronic information boards if the electronic information boards are installed with the same operating system (OS), the same applications, or the same firmware (versions of program can be different), with which the same items can be set as the configuration information of the plurality of electronic information boards. Further, it is not necessary to set the exactly same configuration items for the electronic information boards, but the electronic information boards set with common configuration items can be used.

An administrator knows which electronic information board 2 is used as the synchronization partner and which electronic information board 2 is used as the synchronization source. The electronic information board 2α used as the synchronization source is registered with information of other electronic information boards to be used as the synchronization partner, such as internet protocol (IP) address or the like of the other electronic information boards. Further, one or more electronic information boards having no synchronization function can be registered in the electronic information board 2α (synchronization source) because the one or more electronic information boards having no synchronization function may not cause trouble to the electronic information board 2 used as the synchronization partner. If the electronic information board 2 having the synchronization function is erroneously registered as the electronic information board 2 not as the synchronization partner in the electronic information board 2α (synchronization source), for example, the electronic information board 2 can set with settings for determining whether the electronic information board 2 is to be used as the synchronization partner, and the electronic information board 2α (synchronization source) can request an inquiry of the settings to the electronic information board 2.

Since the electronic information board 2α is one of the electronic information boards 2 used as the synchronization source, the electronic information board 2α is not necessary to be the electronic information board 2 having a special function. Therefore, any electronic information board 2 (synchronization partner) can be used as the electronic information board 2α (synchronization source) depending on the settings by the administrator. Further, the electronic information board 2 having a special function can be used as the electronic information board 2α (synchronization source).

Further, the electronic information board 2α used as the synchronization source is not required to include some functions of the electronic information board in some cases. That is, the electronic information board 2α used as the synchronization source can be replaced with any information processing apparatus such as PC that can store the configuration information. The PC may be disposed on a LAN, or disposed as a server on the Internet or cloud.

The terminal apparatus 30 is an information processing apparatus configured to communicate with one or more electronic information boards 2 so that the administrator can set various settings and confirm the status of various settings. The administrator operates the terminal apparatus 30 to set the configuration information of the electronic information board 2α used as the synchronization source. Further, the terminal apparatus 30 can be used to set the configuration information of any electronic information board 2 used as the synchronization partner. Further, the terminal apparatus 30 can be configured to display the configuration information applied to the electronic information board 2.

In the terminal apparatus 30, a browser software or a program having equivalent functions is operated. The electronic information board 2 has a function of a web server. Therefore, any information processing apparatus can be used as the terminal apparatus 30. Specifically, the terminal apparatus 30 can be, for example, a PC, a smart phone, a tablet terminal, a wearable PC such as a sunglasses type or a wristwatch type, a personal digital assistant (PDA) or the like. In addition, the terminal apparatus 30 can be a game machine or a navigation device where a browser software or an equivalent program can be operated.

Figure 3:
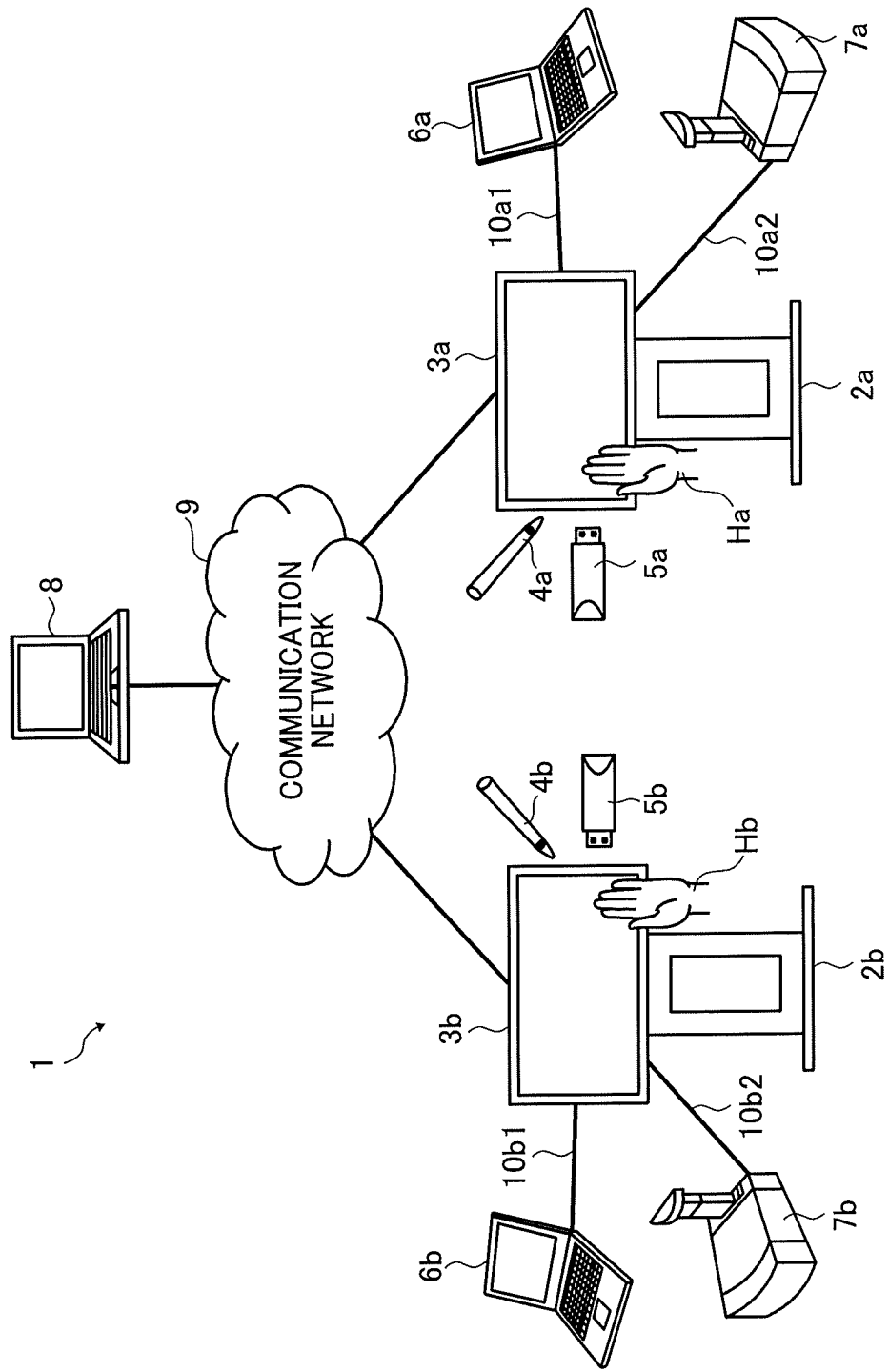
FIG. 3 illustrates an example of an operation of an electronic information board.

Operation of Electronic Information Board:

FIG. 3 illustrates an example of an operation of the electronic information board 2. To simplify the description, FIG. 3 illustrates two electronic information board boards 2a and 2b respectively disposed with electronic pens 4a and 4b, but three or more electronic information boards and electronic pens can be used. In a case of daily use, it is not necessary for each user to recognize whether the electronic information board 2 is used as the synchronization source or the synchronization partner.

As illustrated in FIG. 3, an electronic information board system 1 includes, for example, a plurality of electronic information boards 2a and 2b, a plurality of electronic pens 4a and 4b, a plurality of USB memories 5a and 5b, a plurality of note PCs 6a and 6b, a plurality of teleconference terminals 7a and 7b, and a PC 8. Further, the electronic information boards 2a and 2b and the PC 8 are communicatively connected via a communication network 9. Further, the plurality of electronic information boards 2a and 2b are respectively provided with display 3a and 3b. Further, the electronic information board 2a can display images drawn by an event caused by the electronic pen 4a on the display 3a. The event caused by the electronic pen 4a means, for example, touching a front tip or an end tip of the electronic pen 4a on the display 3a. Further, images displayed on the display 3a can be changed using not only the electronic pen 4a but also an event generated by a user's hand Ha, such as a gesture of enlargement, reduction, page turning, or the like.

Further, the electronic information board 2a can be connected to the USB memory 5a, in which the electronic information board 2a can read electronic files such as portable document format (PDF) files from the USB memory 5a, and the electronic information board 2a can store electronic files in the USB memory 5a. Further, the electronic information board 2a is connected to the note PC 6a via a cable 10a1 capable of communication using standards, such as DisplayPort (registered trademark), digital visual interface (DVI), high definition multimedia interface (HDMI, registered trademark), and video graphics array (VGA). Then, the electronic information board 2a generates an event by contacting the electronic pen 4a or hand Ha on the display 3a, and transmits the event information to the note PC 6a similar to an event caused by an input device such as a mouse or a keyboard. Similarly, the electronic information board 2a is connected to a teleconference terminal 7a via a cable 10a2 capable of communication using the above described standards. The function of the teleconference terminal 7a can be incorporated into the electronic information board 2a. Further, the note PC 6a and the teleconference terminal 7a may communicate with the electronic information board 2a using a wireless communication in accordance with various wireless communication protocols such as Bluetooth (registered trademark).

Further, the electronic information board 2b disposed at another location including the display 3b, the electronic pen 4b, the USB memory 5b, the note PC 6b, the teleconference terminal 7b, a cable 10b1, and a cable 10b2 can be used as similar to the above described electronic information board 2a. Further, an image displayed on the display 3b can be changed based on an event generated by a user's hand Hb or the like.

In the above described configuration, an image drawn on the display 3a of the electronic information board 2a disposed at one location can be also displayed on the display 3b of the electronic information board 2b disposed at another location, and an image drawn on the display 3b of the electronic information board 2b disposed at another location can be displayed on the display 3a of the electronic information board 2a disposed at one location. As above described, since the electronic information board system 1 can perform remote sharing that shares the same image at remote locations, it is convenient for users when the users hold a conference connecting remote locations.

In this description, the plurality of displays may be simply indicated as the display 3.

Figure 4:
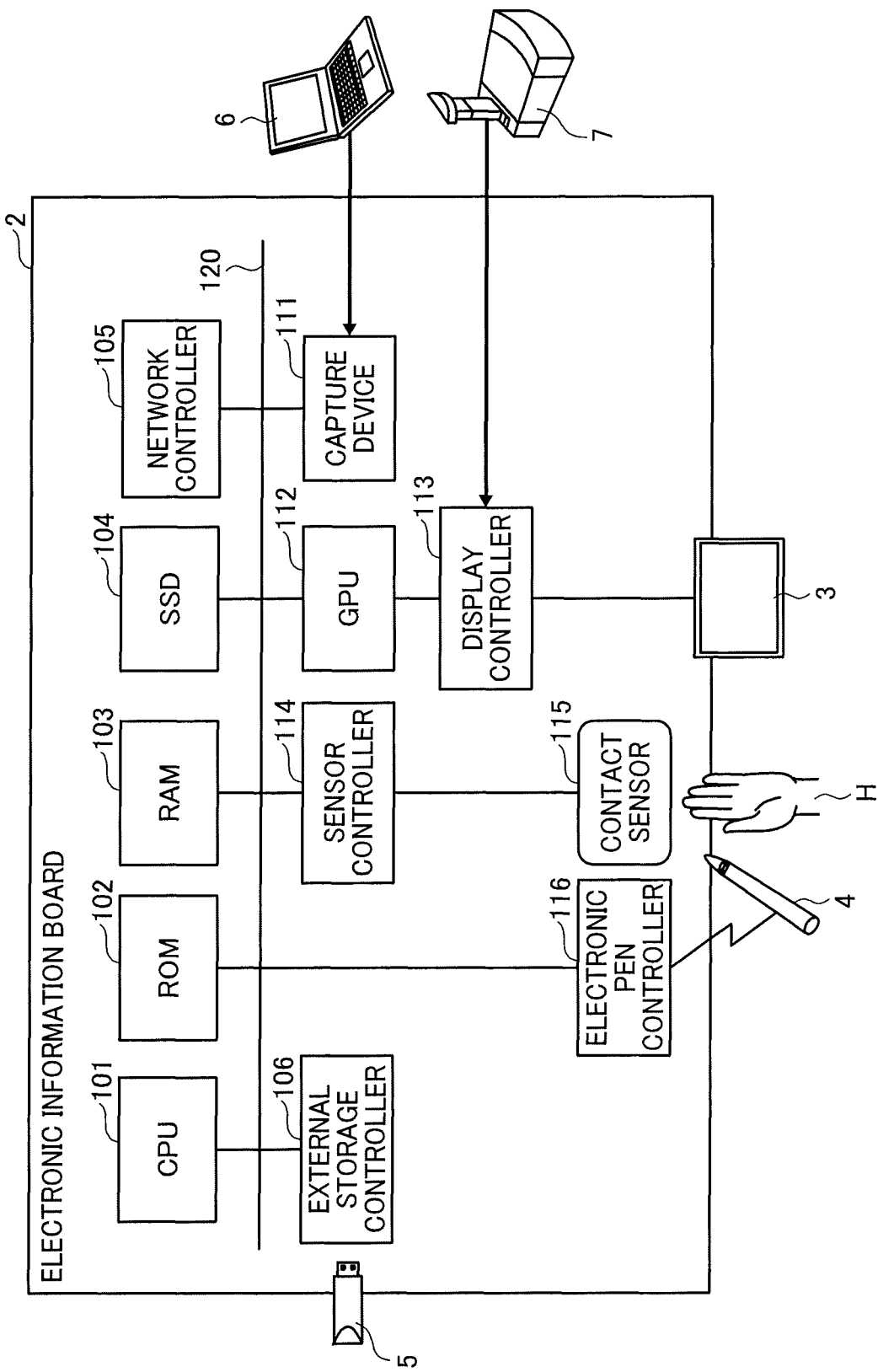
FIG. 4 illustrates an example of a hardware block diagram of an electronic information board.

Hardware Configuration of Electronic Information Board:

Hereinafter, a description is given of a hardware configuration of the electronic information board with reference to FIG. 4. FIG. 4 illustrates an example of a hardware block diagram of the electronic information board 2.

As illustrated in FIG. 4, the electronic information board 2 includes, for example, a central processing unit (CPU) 101, a read only memory (ROM) 102, a random access memory (RAM) 103, a solid state device (SSD) 104, a network controller 105, and an external storage controller 106. The CPU 101 controls entire operations of the electronic information board 2. The ROM 102 stores programs such as an initial program loader (IPL) for driving the CPU 101. The RAM 103 is used as a work area of the CPU 101. The SSD 104 stores various data such as programs used for the electronic information board 2. The network controller 105 controls communication between the communication network 9. The external storage controller 106 controls communication between the USB memory 5.

The electronic information board 2 also includes, for example, a capture device 111, a graphics processing unit (GPU) 112, and a display controller 113. The capture device 111 is used to display image information on a display of the note PC 6 as still image or movie image. The GPU 112 processes graphical data. The display controller 113 controls and manages one or more screen displays used for outputting images received from the GPU 112 to the display 3 and the teleconference terminal 7 (video teleconference terminal).

Further, the electronic information board 2 includes, for example, a sensor controller 114, and a contact sensor 115. The sensor controller 114 controls processing of the contact sensor 115. The contact sensor 115 detects that the electronic pen 4 and/or the user's hand H contacts the display 3. The contact sensor 115 detects and acquires coordinates of the contact on the display 3 using an infrared blocking system. The coordinates can be detected and acquired as follows: when two light-emitting-and-receiving devices, each installed at each upper end of the display 3, emit infrared ray in parallel to a face of the display 3, the infrared ray is reflected by a reflection member provided at periphery of the display 3, and then the a receiving element receives the infrared ray coming back along the same light path of the emitted infrared ray. The contact sensor 115 outputs identification (ID) of the infrared ray emitted by the two light-emitting-and-receiving devices and blocked by an object to the sensor controller 114, and the sensor controller 114 identifies a coordinate position where the object contacts. Hereinafter, each IDs described below are examples of identification information.

Further, the contact sensor 115 is not limited to using the infrared blocking system. For example, the contact sensor 115 can use various detection systems, such as a touch panel of an electrostatic capacitance type for detecting a contact position by detecting a change in capacitance, a touch panel of a resistance film type which identifies a contact position by a voltage change of two resistance films facing each other, and a touch panel of an electromagnetic induction type for detecting a contact position by detecting an electromagnetic induction caused by a contact of an object on the touch panel.

The electronic information board 2 further includes, for example, an electronic pen controller 116. By communicating with the electronic pen 4, the electronic pen controller 116 determines whether the front tip or the rear tip of the electronic pen 4 touches the display 3. It should be noted that the electronic pen controller 116 can be configured to determine whether the front tip or the end tip of the electronic pen 4 touches the display 3, and can be also configured to determine whether a grip portion of the electronic pen 4 hold by a user touches the display 3, and whether other portion of the electronic pen 4 touches the display 3.

Further, the electronic information board 2 includes, for example, a bus line 120, such as an address bus or data bus, for electrically connecting the CPU 101, the ROM 102, the RAM 103, the SSD 104, the network controller 105, the external storage controller 106, the capture device 111, the GPU 112, the sensor controller 114, and the electronic pen controller 116.

The programs used for the electronic information board 2 may be recorded on a computer-readable recording medium, such as a compact disk read only memory (CD-ROM), and distributed.

Figure 5:
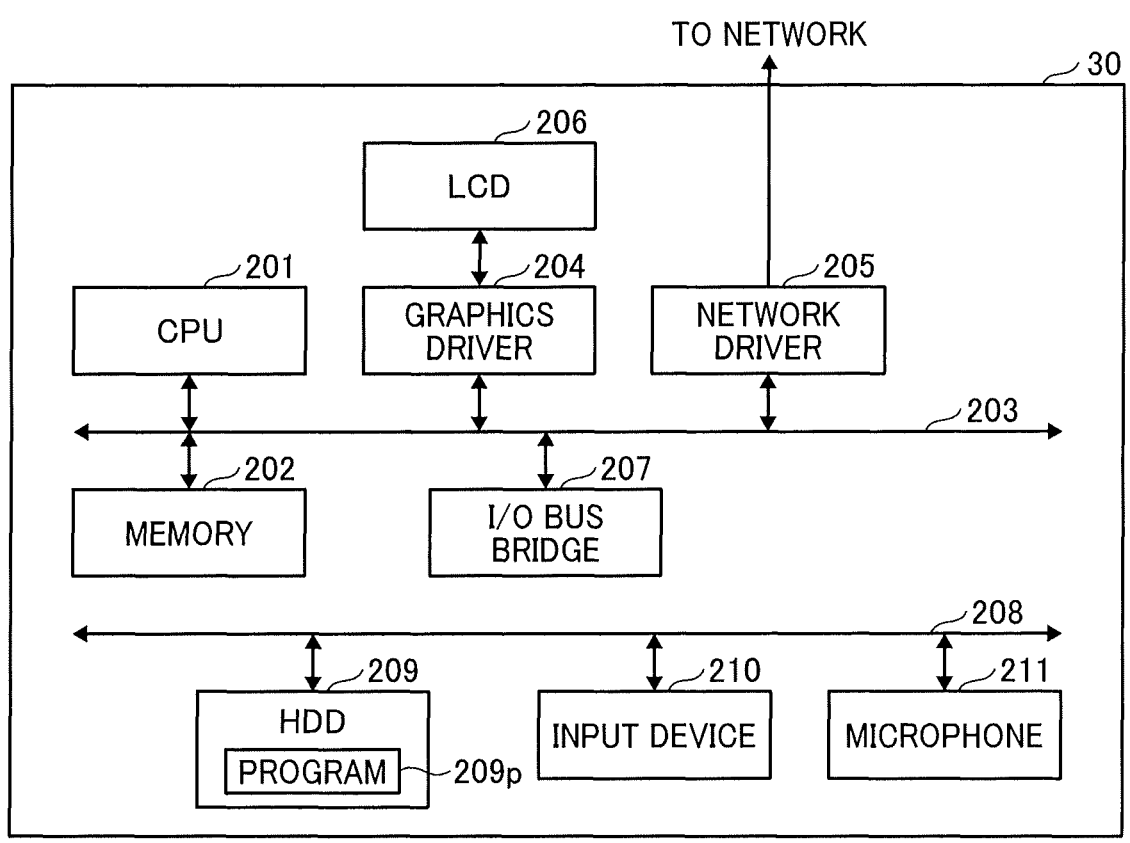
FIG. 5 illustrates an example of a hardware block diagram of a terminal apparatus.

Hardware Configuration of Terminal Apparatus:

FIG. 5 illustrates an example of a hardware block diagram of the terminal apparatus 30. The terminal apparatus 30 includes, for example, a CPU 201, and a memory 202 enabling high-speed access of data used by the CPU 201. The CPU 201 and the memory 202 are connected to other devices or drivers of the terminal apparatus 30, such as a graphics driver 204 and a network driver 205, via a system bus 203.

The graphics driver 204, connected to a liquid crystal display (LCD) 206 used as a display via a bus, monitors processing results by the CPU 201. The network driver 205 connects the terminal apparatus 30 to the network N at the level of the transport layer and the physical layer level, and establishes a session with the electronic information board 2.

The system bus 203 is further connected to an input/output (I/O) bus bridge 207. A storage device such as a hard disk drive (HDD) 209 is connected to the downstream side of the I/O bus bridge 207 using integrated drive electronics (IDE), advanced technology attachment (ATA), ATA packet interface (ATAPI), Serial ATA, small computer system interface (SCSI), universal serial bus (USB) or the like via an input/output (I/O) bus 208 such as peripheral component interconnect (PCI). The HDD 209 stores a program 209$p$ (e.g., browser software) for controlling the terminal apparatus 30 entirely. The HDD 209 can be a solid state drive (SSD). The program 209$p$ may be distributed in a state stored on a storage medium or recoding medium, or may be distributed from a server used for distributing programs.

The I/O bus 208 is further connected to an input device 210, such as a keyboard and a mouse referred to as a pointing device via a bus such as a USB bus, and receives inputs and commands by an operator such as a system administrator via the input device 210.

It should be noted that the hardware configuration of the terminal apparatus 30 illustrated in FIG. 5 only illustrates hardware resources preferably provided for the terminal apparatus 30, and the terminal apparatus 30 can be configured using general known configurations.

Function:

Hereinafter, a description is given of functions of the electronic information board 2α (synchronization source), the electronic information board 2 (synchronization partner), and the terminal apparatus 30 of the communication system 100 with reference to FIG. 6. FIG. 6 illustrates an example of a functional block diagram of the electronic information board 2α (synchronization source), the electronic information board 2 (synchronization partner), and the terminal apparatus 30.

Electronic Information Board of Synchronization Source:

The electronic information board 2α used as the synchronization source includes, for example, a configuration information reception unit 11, a configuration information reception unit 12, a web server unit 13, a configuration information transmitting unit 14, and a configuration information application unit 15. Each of these functional units of the electronic information board 2α is a function or means that is implemented by operating any of the components illustrated in FIG. 4 under an instruction from the CPU 101 executing the programs loaded from the SSD 104 to the RAM 103. In this description, the configuration information reception unit is used as the information reception unit, and the information reception unit is also referred to as the information reception interface. Each of the electronic information boards includes a plurality of information reception units or information reception interfaces. To be described in this description, the configuration information reception unit 11 is used as a second information reception interface that receives the configuration information using the UI setting, and the configuration information reception unit 12 is used as a third information reception interface that receives the configuration information using the web setting.

The electronic information board 2α further includes a storage unit 19. The storage unit 19 is a storage for storing various information, which is implemented by a memory or a storage device, such as the SSD 104, the RAM 103, or the ROM 102 of FIG. 4. The storage unit 19 includes, for example, a setting policy storage unit at the synchronization source (hereinafter, synchronization source setting policy storage unit 191), a current configuration information storage unit 192, a communication acquisition information storage unit 193, and a synchronization source information 194. In this description, the storage unit 19 in the electronic information board 2α used as the synchronization source corresponds to a first memory, and the storage unit 19 in the electronic information board 2 used as the synchronization partner corresponds to a second memory.

Hereinafter, a description is given of information stored in the storage unit 19. The synchronization source information 194 indicates that the concerned electronic information board is used as the electronic information board 2α, that is the synchronization source. The communication acquisition information storage unit 193 stores the configuration information received from the terminal apparatus 30. The current configuration information storage unit 192 stores the configuration information being applied to the electronic information board 2α used as the synchronization source. The applied configuration information is used for controlling and/or defining the operation of the electronic information board 2α (synchronization source). Therefore, the information stored in the current configuration information storage unit 192 and the information stored in the communication acquisition information storage unit 193 are the configuration information used in the embodiment.

TABLE 1

| Printer address | 192.168.10.01 |
|---|---|
| Mail address list | mail2017_05_12.txt |
| Contact list | Clist2017_06_12.txt |
| Shared folder | File://.../hoge/ |
| Template | Template 1 |

Table 1 schematically illustrates an example of configuration information stored in the current configuration information storage unit 192 or the communication acquisition information storage unit 193. Since the configuration information includes many items, Table 1 shows only a part of the information. Table 1 includes items of printer address, mail address list, contact list, shared folder, and template. The printer address is an internet protocol (IP) address of a printer used by the electronic information board 2. The mail address list is a list of e-mail addresses that can be sent from the electronic information board 2. The contact list is a list of other electronic information boards (e.g., IP address) to which the electronic information board 2 communicates. The shared folder is a folder, in which the electronic information boards 2 disposed in the communication system 100 store page data (e.g., stroke data of one screen) as shared data. The template is a background image data (e.g., texture) displayed on the display 3.

As described above, since the configuration information includes information that must be set by the administrator for a plurality of the electronic information boards 2, the workload of setting the configuration information on each electronic information board 2 can be reduced by synchronizing the configuration information between the plurality of the electronic information boards 2.

TABLE 2

| Synchronization partner list | 192.168.10.02 |
|---|---|
| | 192.168.10.03 |
| | 192.168.10.04 |
| | . . . |
| Synchronization timing | 6 AM every day |
| | Reactivation timing |
| | Every 12 hours |

Table 2 schematically illustrates information stored in the synchronization source setting policy storage unit 191. The synchronization source setting policy storage unit 191 includes items, such as a synchronization partner list, and synchronization timing. The synchronization partner list registers information used for communicating with the electronic information board 2 (synchronization partner), such as one or more IP addresses. The synchronization timing registers information of timing of transmitting the configuration information to the electronic information board 2 (synchronization partner) from the electronic information board 2α (synchronization source). The synchronization timing can be selected from a plurality of selectable items illustrated in Table 2. For example, the selectable items include a given time point set for every day, reactivation timing, or periodical timing (pre-set time) as the synchronization timing. When the current time becomes the synchronization timing, the electronic information board 2α (synchronization source) transmits the configuration information to the electronic information board 2 registered in the synchronization partner list. As described in the embodiments, the transmitted configuration information may be discarded by the electronic information board 2 used as the synchronization partner in some cases. The information stored in the synchronization source setting policy storage unit 191 is preset, for example, by the administrator.

Function of Electronic Information Board of Synchronization Source:

The electronic information board 2α used as the synchronization source receives the configuration information in two ways. One way is a method using the "UI setting" that receives the configuration information by operating a user interface (UI) displayed on the display 3 having a touch panel of the electronic information board 2α, and another way is a method using the "web setting" that receives the configuration information from the terminal apparatus 30. In the web setting, the administrator can set each item one by one, or text data (e.g., XML data) describing all items of the configuration information collectively.

The configuration information reception unit 11 receives the configuration information input from the display 3 for the electronic information board 2α (synchronization source). Then, the configuration information reception unit 11 stores the received configuration information in the current configuration information storage unit 192. Therefore, when the configuration information reception unit 11 receives the configuration information, the received configuration information is applied in the electronic information board 2α in real time. The configuration information reception unit 11 is implemented by the CPU 101 of the electronic information board 2α (synchronization source) executing programs and controlling the electronic pen controller 116 and the contact sensor 115. The configuration information reception unit 11 is used as the second information reception interface in this description.

The web server unit 13 generates a web page described in hypertext markup language (HTML), JavaScript (registered trademark), cascading style sheets (CSS), and the like, and transmits the web page to the terminal apparatus 30. The web server unit 13 provides a web application for dynamically generating the web page. In the embodiments, the web server unit 13 transmits the web page used for setting the configuration information to the terminal apparatus 30, and then the web server unit 13 receives the configuration information from the terminal apparatus 30. The web server unit 13 is implemented by executing programs using the CPU 101 and controlling the network controller 105 of the electronic information board 2α (synchronization source).

The configuration information reception unit 12 acquires the configuration information from the terminal apparatus 30 via the web server unit 13, and stores the acquired configuration information in the communication acquisition information storage unit 193 (web setting). The configuration information is applied in the electronic information board 2α (synchronization source) by shutting down and reactivating the electronic information board 2α. The configuration information reception unit 12 is implemented by executing programs using the CPU 101 of the electronic information board 2α (synchronization source). The configuration information reception unit 12 is used as the third information reception interface in this description.

When the electronic information board 2α used as the synchronization source is shut down and reactivated, the configuration information application unit 15 stores the configuration information, stored in the communication acquisition information storage unit 193, in the current configuration information storage unit 192. Since the electronic information board 2α is operated based on the configuration information of the current configuration information storage unit 192, when the configuration information in the communication acquisition information storage unit 193 is stored in the current configuration information storage unit 192, the configuration information is applied to the electronic information board 2α. Therefore, after the terminal apparatus 30 transmits the configuration information to the electronic information board 2α (synchronization source), and then the electronic information board 2α is shut down and reactivated, the configuration information received from the terminal apparatus 30 is applied to the operation of the electronic information board 2α. The configuration information application unit 15 is implemented by executing programs using the CPU 101 of the electronic information board 2α (synchronization source).

The configuration information transmitting unit 14 transmits the configuration information to the electronic information board 2 used as the synchronization partner (i.e., one or more electronic information boards 2) at the synchronization timing set in the synchronization source setting policy storage unit 191. The configuration information transmitting unit 14 does not need to record a result of a query or whether the information is transmitted or not. The configuration information transmitting unit 14 is implemented by executing programs using the CPU 101 and controlling the network controller 105 of the electronic information board 2α (synchronization source).

Electronic Information Board of Synchronization Partner:

As to the function of the electronic information board 2 used as the synchronization partner, the difference from the electronic information board 2α used as the synchronization source is described. The electronic information board 2 used as the synchronization partner includes, for example, the configuration information reception unit 11, the configuration information reception unit 12, the web server unit 13, the configuration information application unit 15, a synchronization information reception unit 16, and a priority determining unit 17. Therefore, different from the electronic information board 2α used as the synchronization source, the electronic information board 2 used as the synchronization partner includes the synchronization information reception unit 16 and the priority determining unit 17. To be described in this description, the synchronization information reception unit 16 is used as a first information reception interface that receives the configuration information using the synchronization setting.

Further, as to the electronic information board 2 used as the synchronization partner, the storage unit 19 includes the current configuration information storage unit 192, the communication acquisition information storage unit 193, a setting policy storage unit at the synchronization partner (hereinafter, synchronization partner setting policy storage unit 195), and a synchronization acquisition configuration information storage unit 196. Therefore, different from the electronic information board 2α used as the synchronization source, the electronic information board 2 used as the synchronization partner includes the synchronization partner setting policy storage unit 195 and the synchronization acquisition configuration information storage unit 196.

Hereinafter, a description is given of the synchronization acquisition configuration information storage unit 196. The electronic information board 2 used as the synchronization partner is configured to receive the configuration information in three ways or three routes. Two of the three ways (i.e., UI settings, web setting) are the same as the electronic information board 2α used as the synchronization source. The third way is a method for receiving the configuration information from the electronic information board 2α used as the synchronization source (hereinafter, this processing is referred to as the synchronization setting), in which when the electronic information board 2 (synchronization partner) receives the configuration information from the electronic information board 2α (synchronization source), the synchronization acquisition configuration information storage unit 196 of the electronic information board 2 (synchronization partner) stores the configuration information transmitted from the electronic information board 2α (synchronization source).

TABLE 3

| | | Priority order | Flag | Set date/time |
|---|---|---|---|---|
| Information reception unit | UI setting | 1 | FALSE | Jul. 18, 2017, 14:00 |
| | Web setting | 2 | FALSE | Jul. 18, 2017, 17:00 |
| | Synchronization setting | 3 | FALSE | Jul. 18, 2017, 19:00 |
| Reactivation timing | | | 6 AM each day Reactivation timing Every 12 hours | |

Table 3 schematically illustrates information stored in the synchronization partner setting policy storage unit 195. The synchronization partner setting policy storage unit 195 stores items, such as priority order, flag, and set date/time for each information reception unit by associating with each other. The priority order indicates a priority level of each of the UI setting, the web setting, and the synchronization setting to set a priority order for each of the information reception units. By setting the priority order, the configuration information received via the different information reception units can be selectively set in the electronic information board 2. Specifically, if the configuration information is received via one information reception unit set with the higher priority order, the configuration information received via another information reception unit set with the lower priority order is not applied and stored.

The flag takes a value of "TRUE" or "FALSE." The value of flag indicates whether the configuration information is received by each information reception unit. The initial value of flag is set "FALSE," and the value of flag becomes "TRUE" when the configuration information is received. The electronic information board 2 (synchronization partner) refers to the flag and the priority order to determine whether a specific configuration information is to be discarded or stored.

The set date/time is information indicating a reception date and time at which the configuration information is received by each information reception unit. The set date/time can be used for determining which configuration information is to be applied on the electronic information board 2 when two or more configuration information are received.

The reactivation timing is the timing at which the electronic information board 2 (synchronization partner) is shut down and reactivated. The reactivation means that the electronic information board 2 is shut down and activated immediately. Since the electronic information board 2 is configured to apply the configuration information by shutting down and reactivating, the configuration information is applied at the reactivation timing. Further, the reactivation timing can be selected from a plurality of selectable items illustrated in Table 3 as similar to the synchronization timing in Table 2.

The information stored in the synchronization partner setting policy storage unit 195 is preset by an administrator from the terminal apparatus 30 or the display 3. For example, the priority order can be set arbitrarily by the administrator.

Function of Electronic Information Board of Synchronization Partner:

The synchronization information reception unit 16 receives the configuration information from the electronic information board 2α (synchronization source). The synchronization information reception unit 16 is implemented by executing programs using the CPU 101 and controlling the network controller 105 of the electronic information board 2 (synchronization partner). The synchronization information reception unit 16 is used as the first information reception interface in this description.

By referring to the synchronization partner setting policy storage unit 195, the configuration information application unit 15 of the electronic information board 2 (synchronization partner) applies the configuration information having the most-recent set date/time, among the configuration information having the flag of "TRUE," in the electronic information board 2 (synchronization partner). That is, the most relevant configuration information is stored in the current configuration information storage unit 192.

Hereinafter, a description is given of the priority determining unit 17. In a case of the UI setting, the configuration information is applied in the electronic information board 2 in real time, but in cases of the web setting and the synchronization setting, the configuration information is applied to the electronic information board 2 by reactivating the electronic information board 2. This is because to prevent the change of the configuration information while a user is performing the web setting and synchronization setting. By contrast, since the user changes each item while performing the UI setting, the information integrity may not matter even if the configuration information is changed, but changes of the configuration information is preferably applied quickly.

In the above described configuration, when one configuration information is received via one information reception unit set with the higher priority order and another configuration information is received via another information reception unit set with the lower priority order under an assumption that the one information reception unit and another configuration information are not the information reception unit used for the UI setting, the priority determining unit 17 checks a flag of the one information reception unit set with the higher priority order and a flag of another information reception unit set with the lower priority order. If the flag of the one information reception unit set with the higher priority order is "FALSE," another configuration information received via another information reception unit set with the lower priority order is stored. On the other hand, if the flag of the one information reception unit set with the higher priority order is "TRUE," the configuration information received via the one information reception unit set with the higher priority order is stored, and another configuration information received via another information reception unit set with the lower priority order is discarded. With this processing, the configuration information set with the high priority order can being applied without applying the configuration information having the lower priority order that is received at the most recent time. The configuration information application unit 15 is implemented by executing programs using the CPU 101 of the electronic information board 2 (synchronization partner).

Figure 6A:
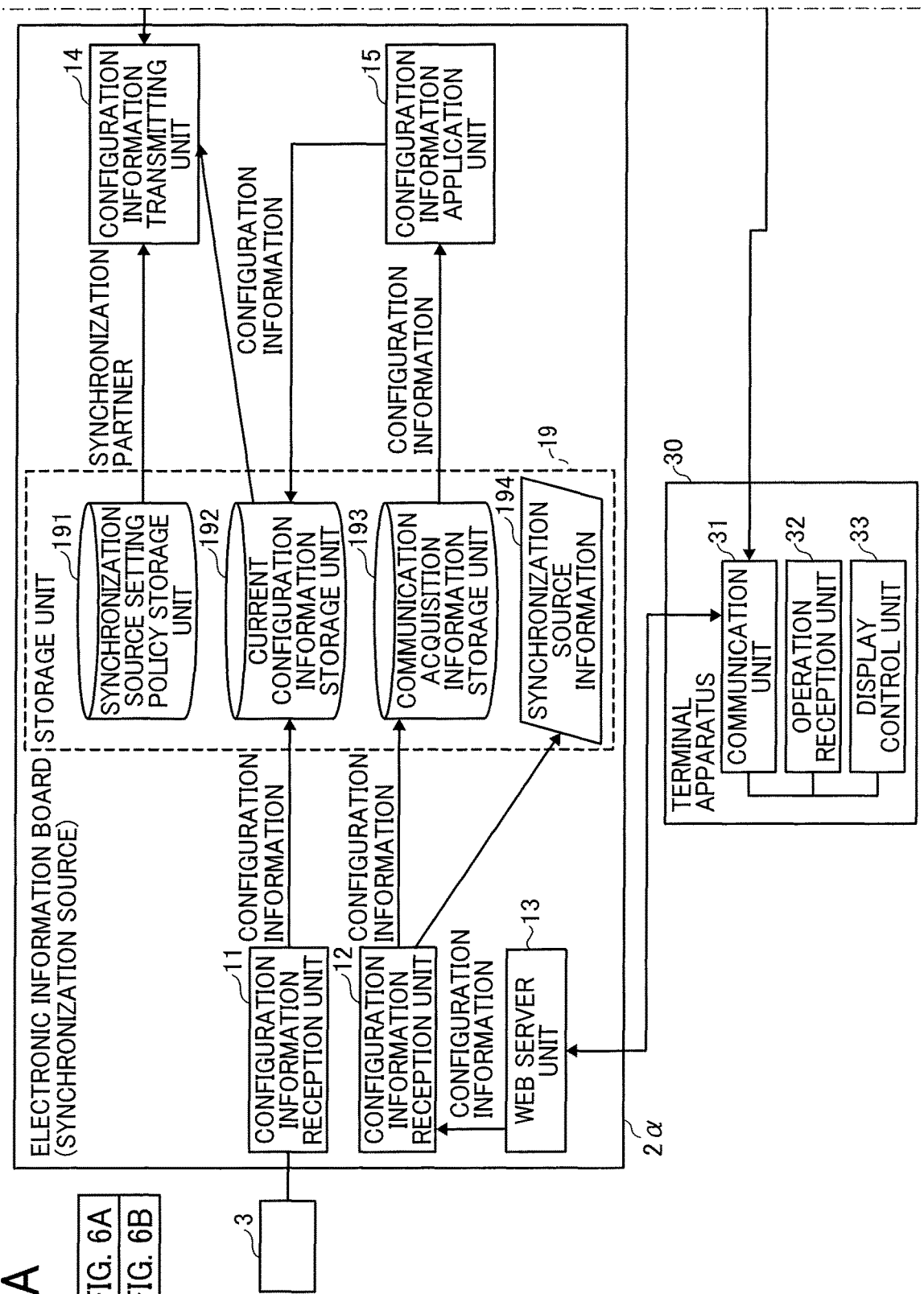
FIGS. 6A and 6B illustrate an example of a functional block diagram of an electronic information board used as a synchronization source, an electronic information board used as a synchronization partner, and a terminal apparatus.
Figure 6B:
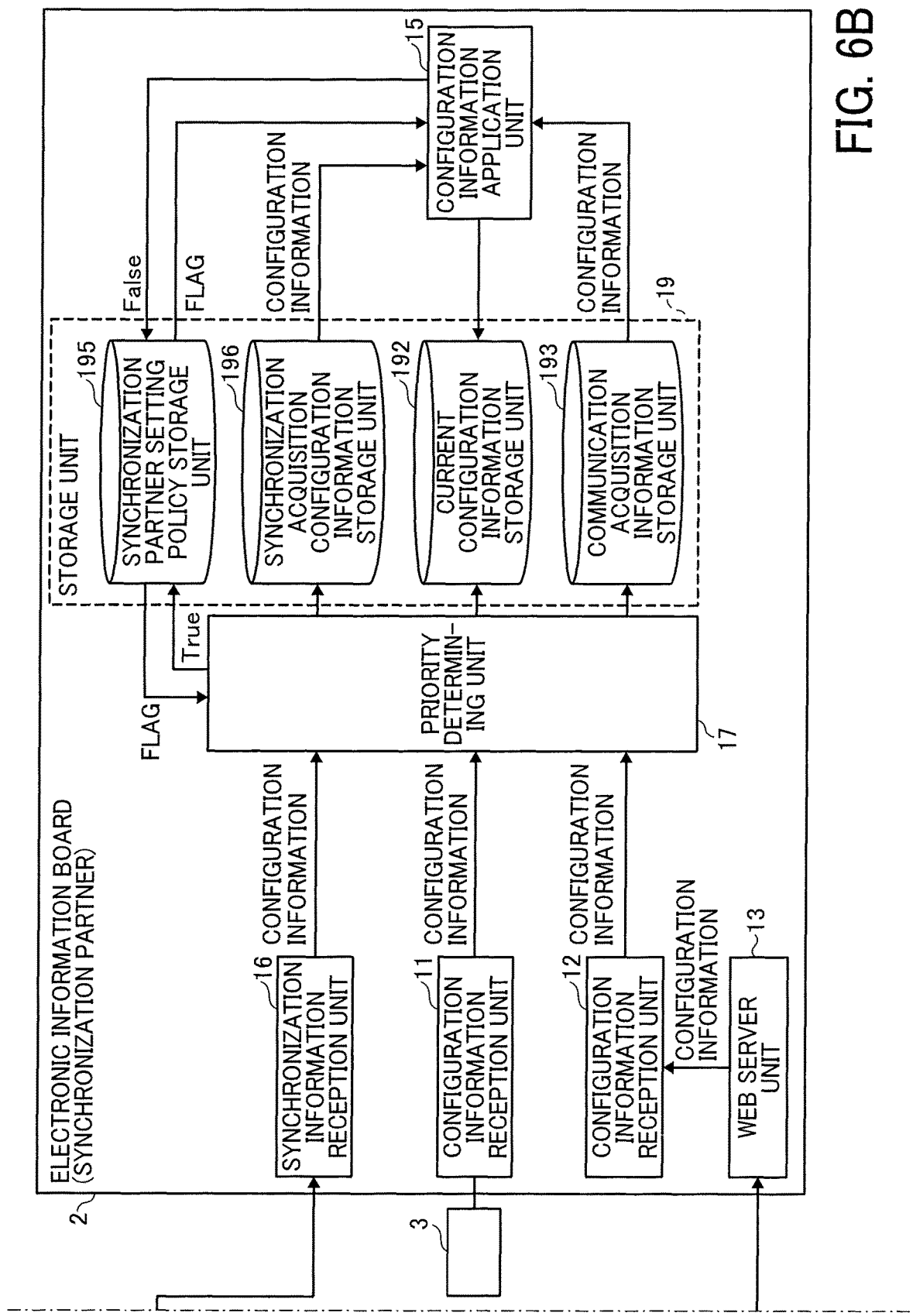

Terminal Apparatus:

As illustrated in FIG. 6A, the terminal apparatus 30 includes, for example, a communication unit 31, an operation reception unit 32, and a display control unit 33. Each of the functional units of the terminal apparatus 30 is a function or means implemented by operating one of the components illustrated in FIG. 5 under an instruction from the CPU 201 executing the programs loaded from the HDD 209 to the memory 202.

The communication unit 31 transmits and receives various kinds of information with the electronic information board 2a used as the synchronization source and the electronic information board 2 used as the synchronization partner. In the embodiments, the communication unit 31 receives a web page, and transmits the configuration information. The communication unit 31 is implemented by executing the program 209p using the CPU 201 and controlling the network driver 205 of the terminal apparatus 30.

The operation reception unit 32 receives various operations of an administrator to the terminal apparatus 30. The operation reception unit 32 is implemented by executing the program 209p using the CPU 201 and controlling the input device 210 of the terminal apparatus 30.

The display control unit 33 analyzes the web page received from the electronic information board 2, and generates a screen image to be displayed on the LCD 206. Further, the display control unit 33 updates the screen image in accordance with a user input received by the operation reception unit 32. The display control unit 33 is implemented by executing the program 209p using the CPU 201 and controlling the graphics driver 204 of the terminal apparatus 30.

Setting of Synchronization Source:

In the embodiment, any electronic information board 2 can be set as the electronic information board 2α used as the synchronization source according to the setting of the synchronization source. When the electronic information board 2, not set as the synchronization source, is registered in the synchronization partner list, the electronic information board 2 can be used as the synchronization partner.

FIG. 7 illustrates an example of a synchronization source setting screen 301 displayed on the LCD 206 using a browser software of the terminal apparatus 30. An administrator designates the electronic information board 2 to be set as the synchronization source using the terminal apparatus 30, and acquires a web page to display the synchronization source setting screen 301.

The synchronization source setting screen 301 includes, for example, a synchronization source setting field 306. The synchronization source setting field 306 includes, for example, a message 302a of "set as synchronization source of apparatus setting," and a check box 302b. When the administrator clicks or presses the check box 302b, the operation reception unit 32 receives the clicking, and the display control unit 33 displays a check mark on the check box 302b. When this setting is transmitted to the electronic information board 2 (to be used as the synchronization source), the electronic information board 2, which is the communication destination of the terminal apparatus 30, is set as the electronic information board 2α used as the synchronization source.

The synchronization source setting field 306 includes, for example, an upload button 303, a download button 304, and a synchronization test button 305. The upload button 303 is a button for transmitting the synchronization partner list of Table 2 to the electronic information board 2 from the terminal apparatus 30. The download button 304 is a button for receiving the synchronization partner list of Table 2 from the electronic information board 2 at the terminal apparatus 30. The synchronization test button 305 is a button for testing whether synchronization can be established between the electronic information board 2 set as the synchronization partner and the electronic information board 2α set as the synchronization source. When the synchronization test button 305 is pressed, the electronic information board 2α set as the synchronization source receives the configuration information from the electronic information board 2 set as the synchronization partner. With this configuration, it is possible to determine whether communication can be performed on an application layer without a communication test on an IP layer.

Further, the synchronization source setting screen 301 includes a configuration information collective setting field 311 below the synchronization source setting field 306. The configuration information collective setting field 311 includes, for example, an upload button 312 and a download button 313. The download button 313 is a button for receiving the configuration information from any electronic information board 2 at the terminal apparatus 30. The upload button 312 is a button for uploading the configuration information to the electronic information board 2 from the terminal apparatus 30. As described above, the terminal apparatus 30 can download and upload the entire configuration information collectively.

Further, the synchronization source setting screen 301 includes a message 314 of "whiteboard location name, network automatic setting, IP address, subnet mask, and default gateway are not uploaded." This is because the existence of the electronic information board having the same settings causes troubles on communication. Further, the synchronization source setting screen 301 includes a message 315 of "setting of synchronization source (synchronization of apparatus setting) is not uploaded." This is because if the setting of the synchronization source is synchronized at all of the electronic information boards 2, all of the electronic information boards 2 becomes the electronic information board 2α (synchronization source).

Figure 8:
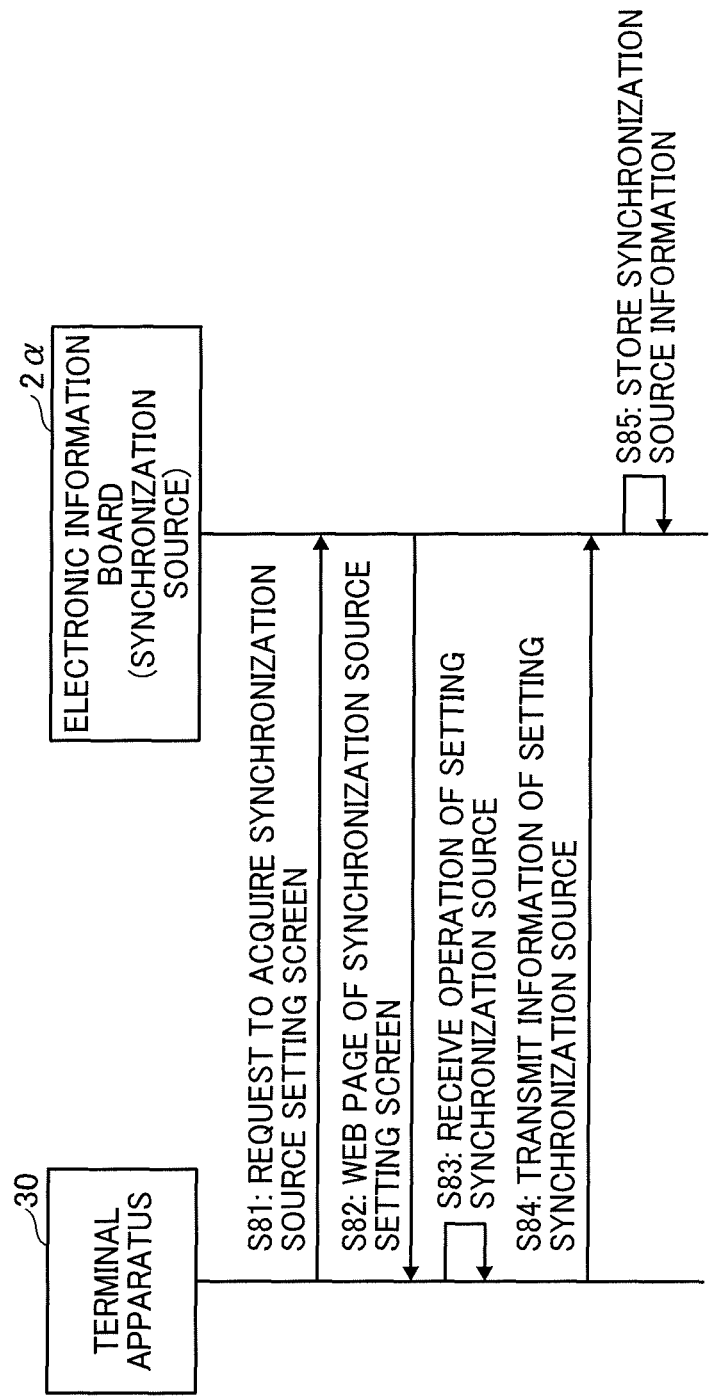
FIG. 8 illustrates an example of a sequence diagram of a procedure when a terminal apparatus sets an electronic information board as a synchronization source.

FIG. 8 illustrates an example of a sequence diagram of a procedure when the terminal apparatus 30 sets the electronic information board 2α as the synchronization source.

S81: When an administrator operates the terminal apparatus 30, the communication unit 31 transmits a request for acquiring the synchronization source setting screen 301 to the electronic information board 2α. The electronic information board 2α to be used as the synchronization source is the electronic information board selected by the administrator as the synchronization source, and it is assumed that an IP address or the like of the electronic information board 2α is known.

S82: The web server unit 13 of the electronic information board 2α to be used as the synchronization source transmits a web page of the synchronization source setting screen 301 in response to the acquisition request of the synchronization source setting screen 301.

S83: The display control unit 33 of the terminal apparatus 30 displays the synchronization source setting screen 301. When the administrator clicks or presses the check box 302b of the message 302a of "set as synchronization source of apparatus setting," the operation reception unit 32 receives an operation of setting the configuration information.

S84: The communication unit 31 of the terminal apparatus 30 transmits information indicating that the synchronization source is set for the electronic information board 2α. The information of synchronization source setting is transmitted by simply clicking or pressing the check box 302b, but the information of synchronization source setting can be transmitted by an explicit transmission operation.

S85: The web server unit 13 of the electronic information board 2α receives the information of synchronization source setting indicating that the electronic information board 2α is set as the synchronization source, and the configuration information reception unit 12 stores the information of synchronization source setting as the synchronization source information 194 in the storage unit 19.

Setting of Configuration Information

Hereinafter, a description is given of setting of the configuration information to the electronic information board 2 with reference to FIGS. 9 to 11. The electronic information board 2 to be set with the configuration information is the synchronization source or the synchronization partner.

Figure 9:
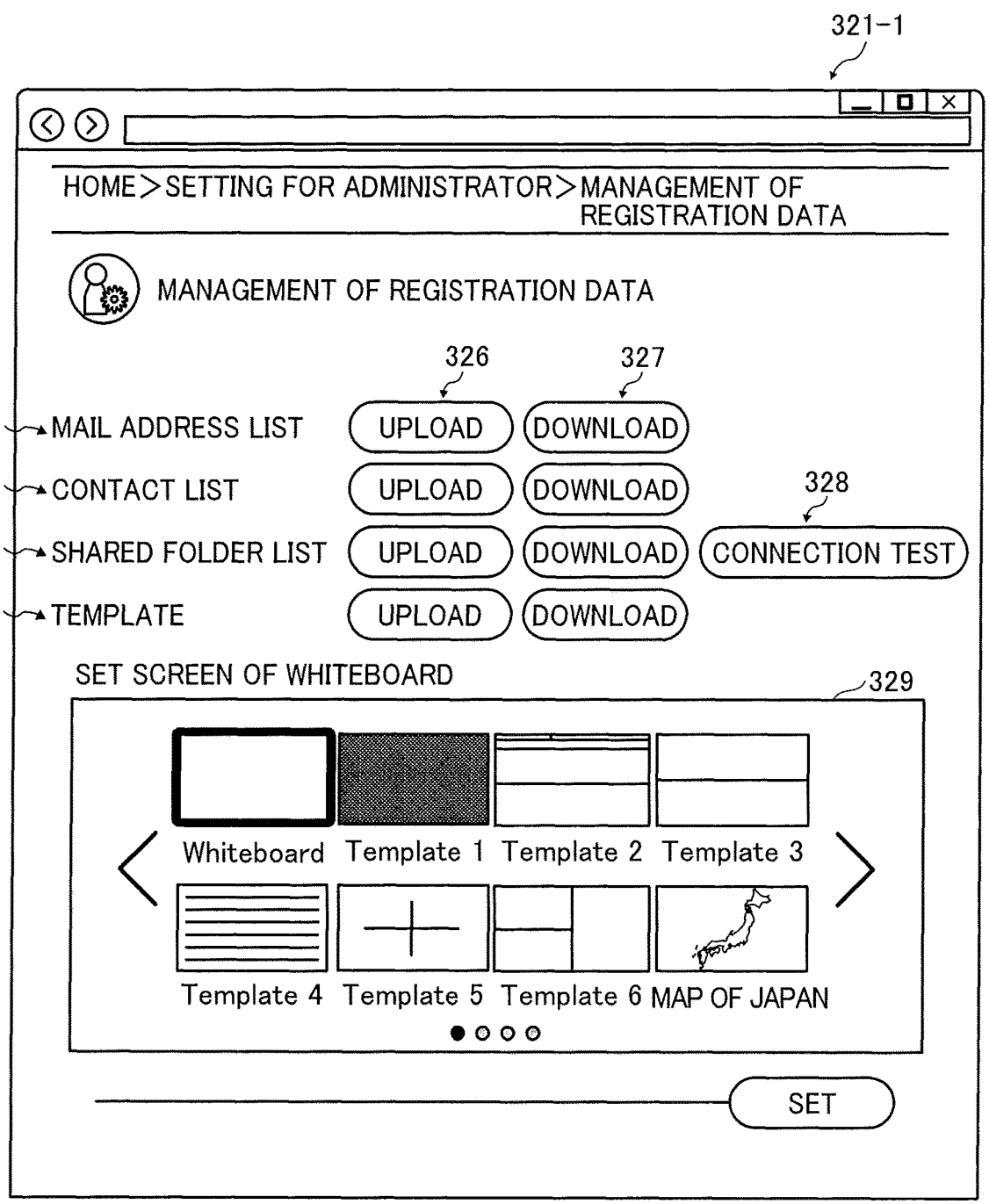
FIG. 9 illustrates an example of a configuration information setting screen displayed on a LCD by a browser software of the terminal apparatus.

FIG. 9 illustrates an example of a configuration information setting screen 321-1 displayed on the LCD 206 using a browser software of the terminal apparatus 30 (web setting). An administrator designates the electronic information board 2 to be set with the configuration information using the terminal apparatus 30, and acquires a web page to display the configuration information setting screen 321-1.

The configuration information setting screen 321-1 includes, for example, a mail address list setting field 322, a contact list setting field 323, a shared folder list setting field 324, and a template setting field 325. The mail address list setting field 322 includes, for example, an upload button 326 and a download button 327. The administrator can set a mail address list by uploading a mail address list prepared in advance. The download button 327 is a button for acquiring the mail address list currently set on the electronic information board 2 by the terminal apparatus 30. The same procedure is applied to the contact list setting field 323 and the template setting field 325. As to the template setting field 325, a sample image 329 of each template is displayed, and the administrator selects a template to be displayed by the electronic information board 2.

Further, a connection test button 328 is displayed in the shared folder list setting field 324. The connection test button 328 is a button used for testing whether the electronic information board 2 can access the shared folder.

Figure 10:
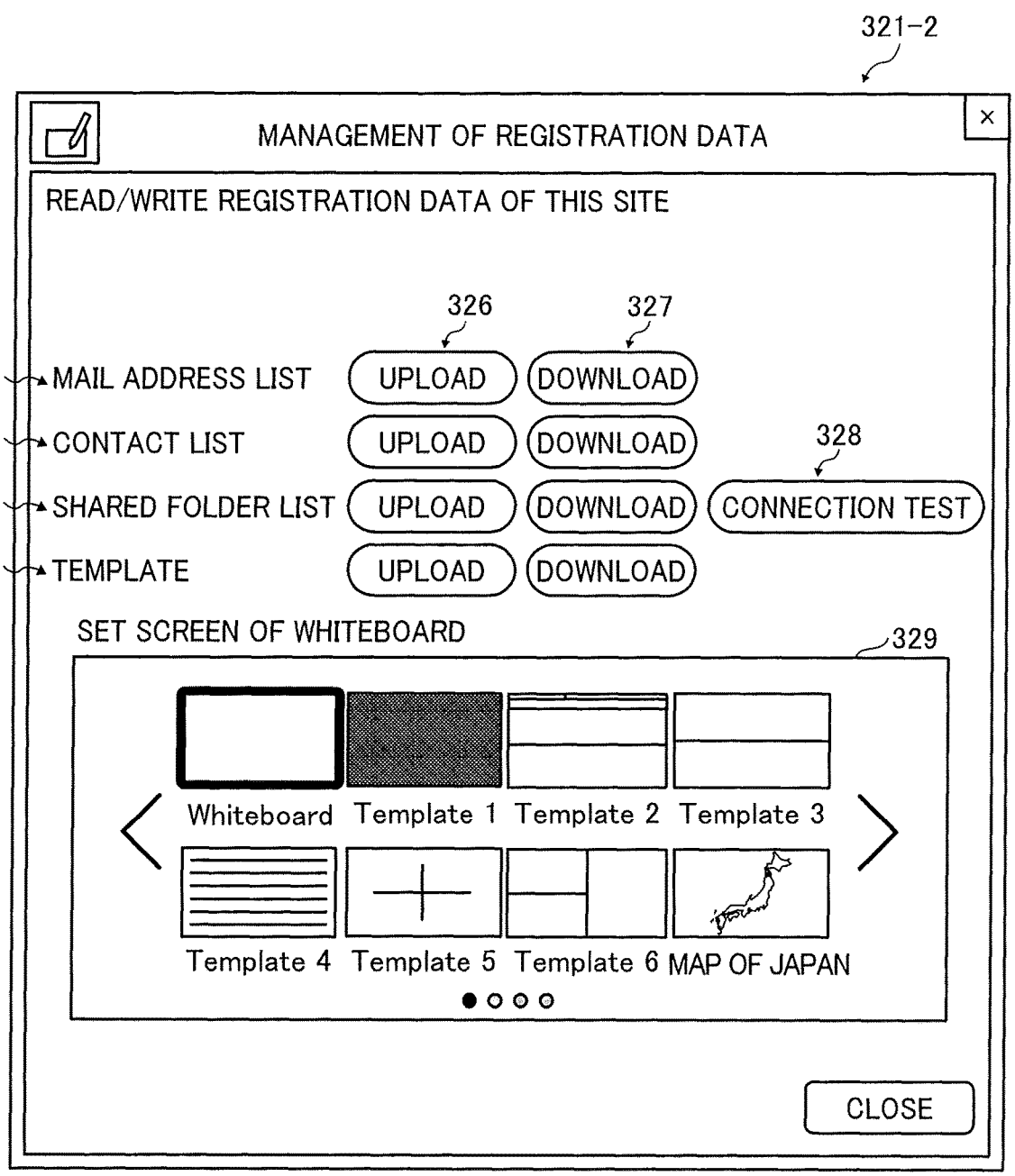
FIG. 10 illustrates an example of a configuration information setting screen displayed on a display of an electronic information board, which is used by an administrator for setting.

FIG. 10 illustrates an example of a configuration information setting screen 321-2 displayed on the display 3 of the electronic information board 2, which is used for a setting process by an administrator (UI setting). The to-be-set information is the same as those in FIG. 9, and the configuration information setting screen 321-2 includes the same items as the configuration information setting screen 321-1. Therefore, the administrator can set the configuration information to any electronic information board 2 without using the terminal apparatus 30.

Figure 11:
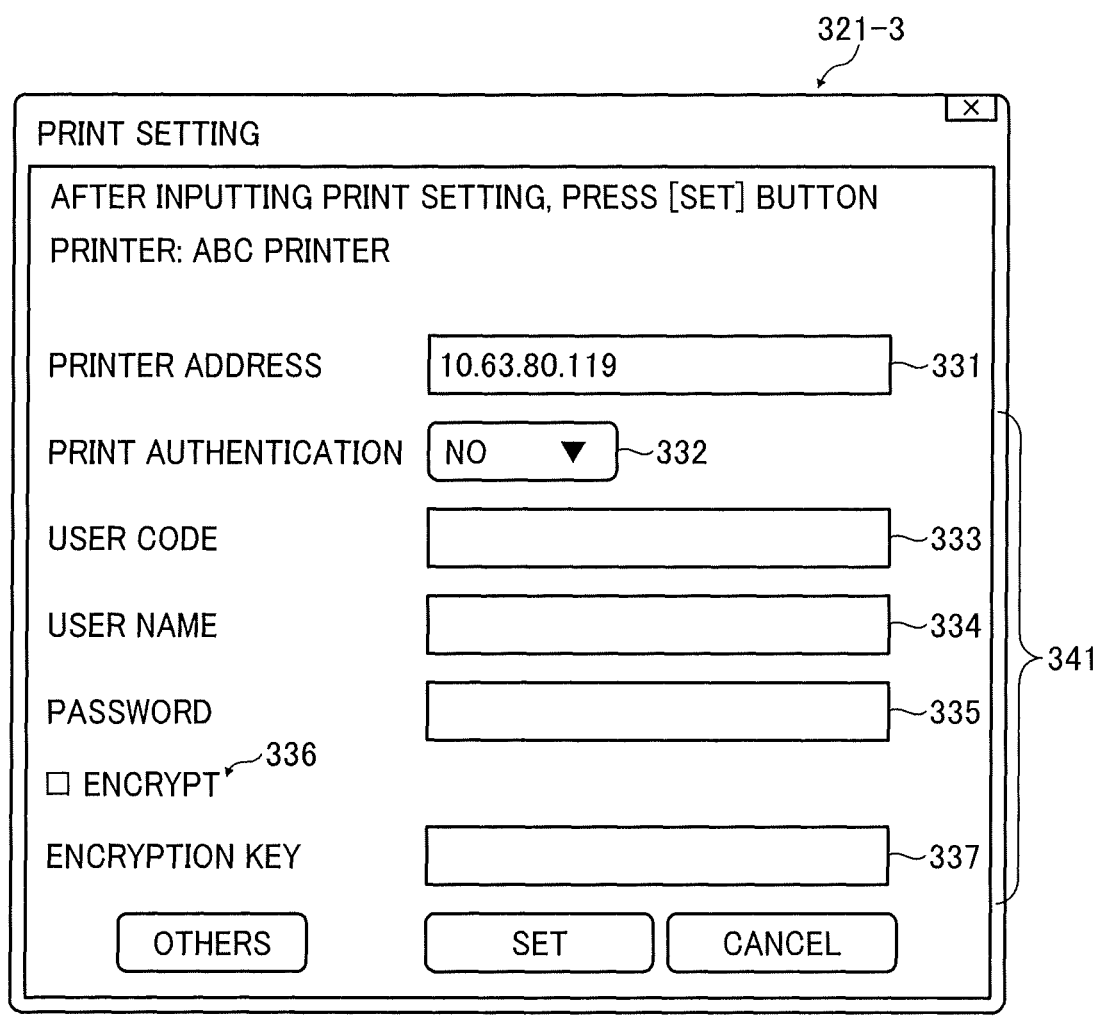
FIG. 11 illustrates an example of a configuration information setting screen for setting a printer address from a display of an electronic information board by an administrator.

FIG. 11 illustrates an example of a configuration information setting screen 321-3 displayed on the display 3 of the electronic information board 2, which is used for setting a printer address by an administrator (UI setting). The configuration information setting screen 321-3 includes, for example, a printer address field 331, and an authentication setting field 341. In the printer address field 331, an IP address of a printer used by the electronic information board 2 is set.

In the authentication setting field 341, a setting button 332 is displayed for setting whether authentication is required when a user uses the printer, and when it is set that authentication is required, authentication information is set. The authentication information is set by using, for example, a user code field 333 in which a user identification (ID) is set, a user name field 334 in which a user name is set, and a password field 335 in which a password is set. Further, a check box 336 for encrypting to-be-printed data, and an input field 337 for inputting an encryption key is displayed.

The configuration information setting screen 321-3 of FIG. 11 can be also performed by the terminal apparatus 30 using the web setting. The configuration information of FIGS. 9 to 11 are just examples, and other configuration information can be set from the terminal apparatus 30 or the electronic information board 2.

FIG. 12 illustrates an example of configuration information stored and communicated by the electronic information board 2. In the embodiments, for example, the configuration information described in the extensible markup language (XML) format is transmitted. The XML format describes data using the format using tags to enclose the item values (elements). In FIG. 12, the configuration information of a mail server is described, but it is only an example, and many items can be included in the configuration information.

The configuration information can be described using the format of JavaScript Object notation (JSON). Further, the configuration information can be described in text data, comma-separated values (CSV) data, or the like.

Figure 13A:
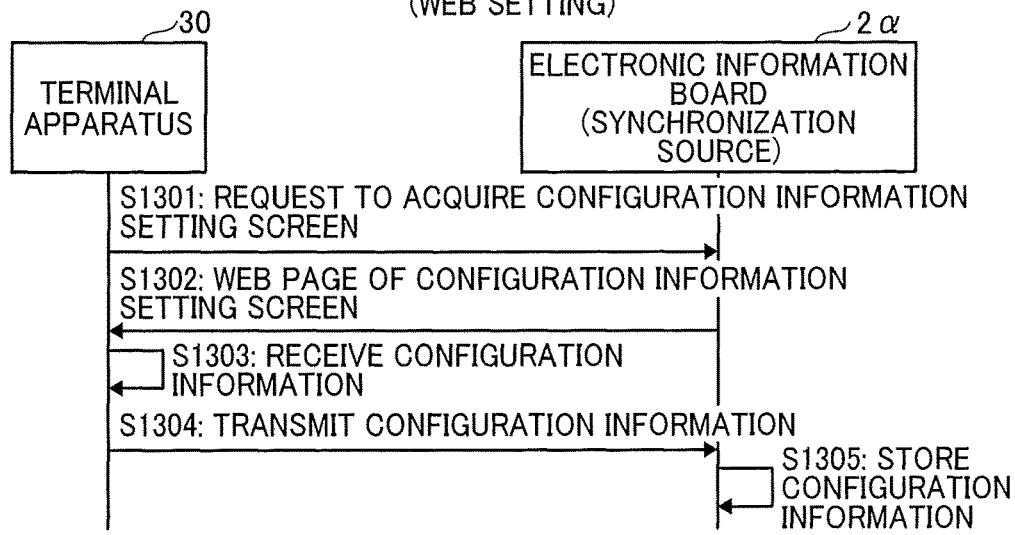
FIG. 13A illustrates an example of a sequence diagram of a procedure for setting configuration information using a web setting.

FIG. 13A illustrates an example of a sequence diagram of a procedure for setting each item of configuration information using the web setting.

S1301: When an administrator operates the terminal apparatus 30, the communication unit 31 transmits a request for acquiring the configuration information setting screen 321-1 to the electronic information board 2α used as the synchronization source. The electronic information board 2α used as the synchronization source is selected by the administrator as the synchronization source from the electronic information boards 2, and it is assumed that an IP address or the like of the electronic information board 2α is known.

S1302: The web server unit 13 of the electronic information board 2α (synchronization source) transmits a web page of the configuration information setting screen 321-1 in response to the request for acquiring the configuration information setting screen 321-1.

S1303: The display control unit 33 of the terminal apparatus 30 displays the configuration information setting screen 321-1 on the LCD 206. When the administrator sets the configuration information as needed, the operation reception unit 32 receives the configuration information.

S1304: The communication unit 31 of the terminal apparatus 30 transmits the configuration information to the electronic information board 2α used as the synchronization source.

S1305: The web server unit 13 of the electronic information board 2α (synchronization source) receives the configuration information, and the configuration information reception unit 12 stores the configuration information in the communication acquisition information storage unit 193.

Figure 13B:
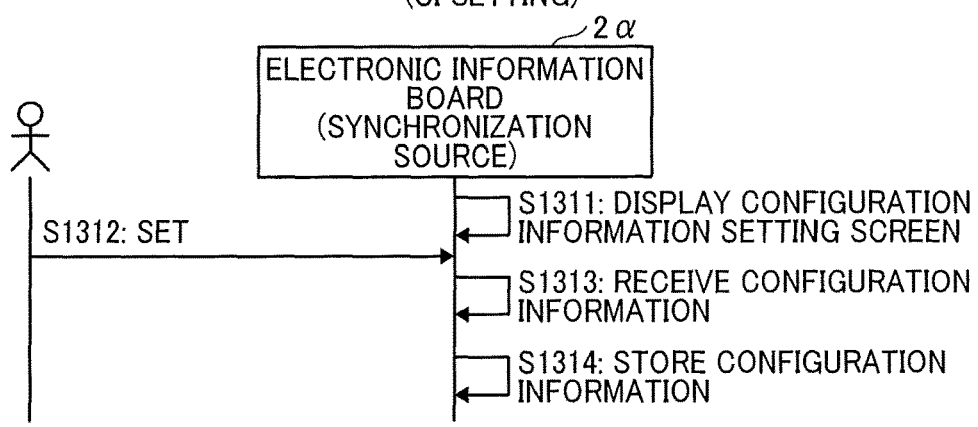
FIG. 13B illustrates an example of a sequence diagram of a procedure for setting configuration information using a UI setting.

FIG. 13B illustrates an example of a sequence diagram of a procedure for setting configuration information using the UI setting.

S1311: When the administrator operates the electronic information board 2α used as the synchronization source, the communication unit 31 displays the configuration information setting screen 321-2 (FIG. 10) and the configuration information setting screen 321-3 (FIG. 11) on the display 3.

S1312: The administrator sets the configuration information as needed.

S1313: The configuration information reception unit 11 of the electronic information board 2α (synchronization source) receives the configuration information.

S1314: The configuration information reception unit 11 stores the configuration information in the current configuration information storage unit 192.

Figure 13C:
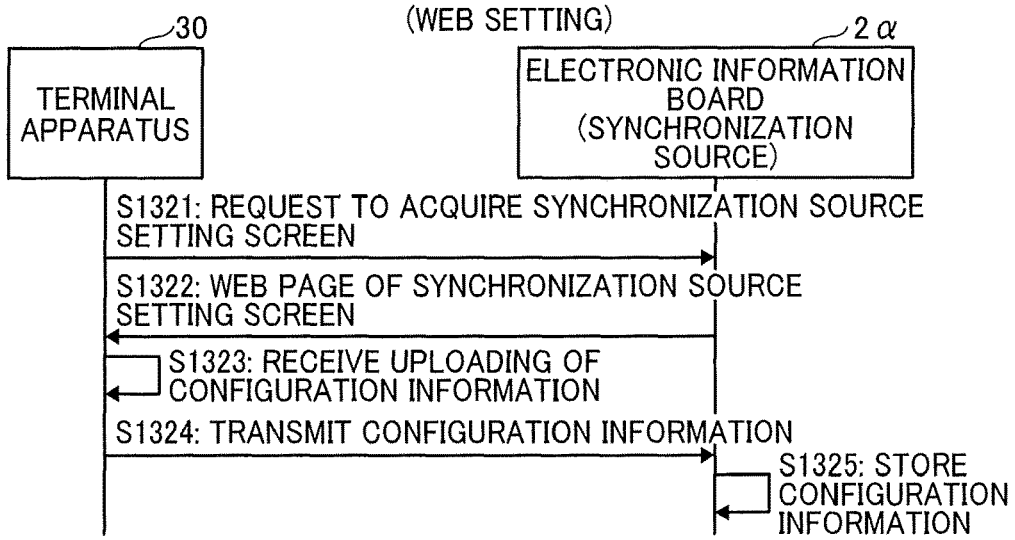
FIG. 13C illustrates an example of a sequence diagram of a procedure for setting entire configuration information collectively using a web setting.

FIG. 13C illustrates an example of a sequence diagram of a procedure for setting the entire configuration information collectively using the web setting.

S1321: When the administrator operates the terminal apparatus 30, the communication unit 31 transmits a request for acquiring the synchronization source setting screen 301 to the electronic information board 2α used as the synchronization source. The electronic information board 2α used as the synchronization source is one of the electronic information boards 2 selected by the administrator as the synchronization source, and it is assumed that an IP address or the like of the electronic information board 2α is known.

S1322: The web server unit 13 of the electronic information board 2α (synchronization source) transmits a web page of the synchronization source setting screen 301 in response to the acquisition request of the synchronization source setting screen 301.

S1323: The display control unit 33 of the terminal apparatus 30 displays the synchronization source setting screen 301 on the LCD 206. When the administrator clicks or presses the upload button 312 in the configuration information collective setting field 311, the operation reception unit 32 receives an operation of uploading the configuration information.

S1324: The communication unit 31 of the terminal apparatus 30 transmits the entire configuration information to the electronic information board 2α used as the synchronization source.

S1325: The web server unit 13 of the electronic information board 2α (synchronization source) receives the entire configuration information, and the configuration information reception unit 12 stores the entire configuration information in the communication acquisition information storage unit 193.

Figure 14:
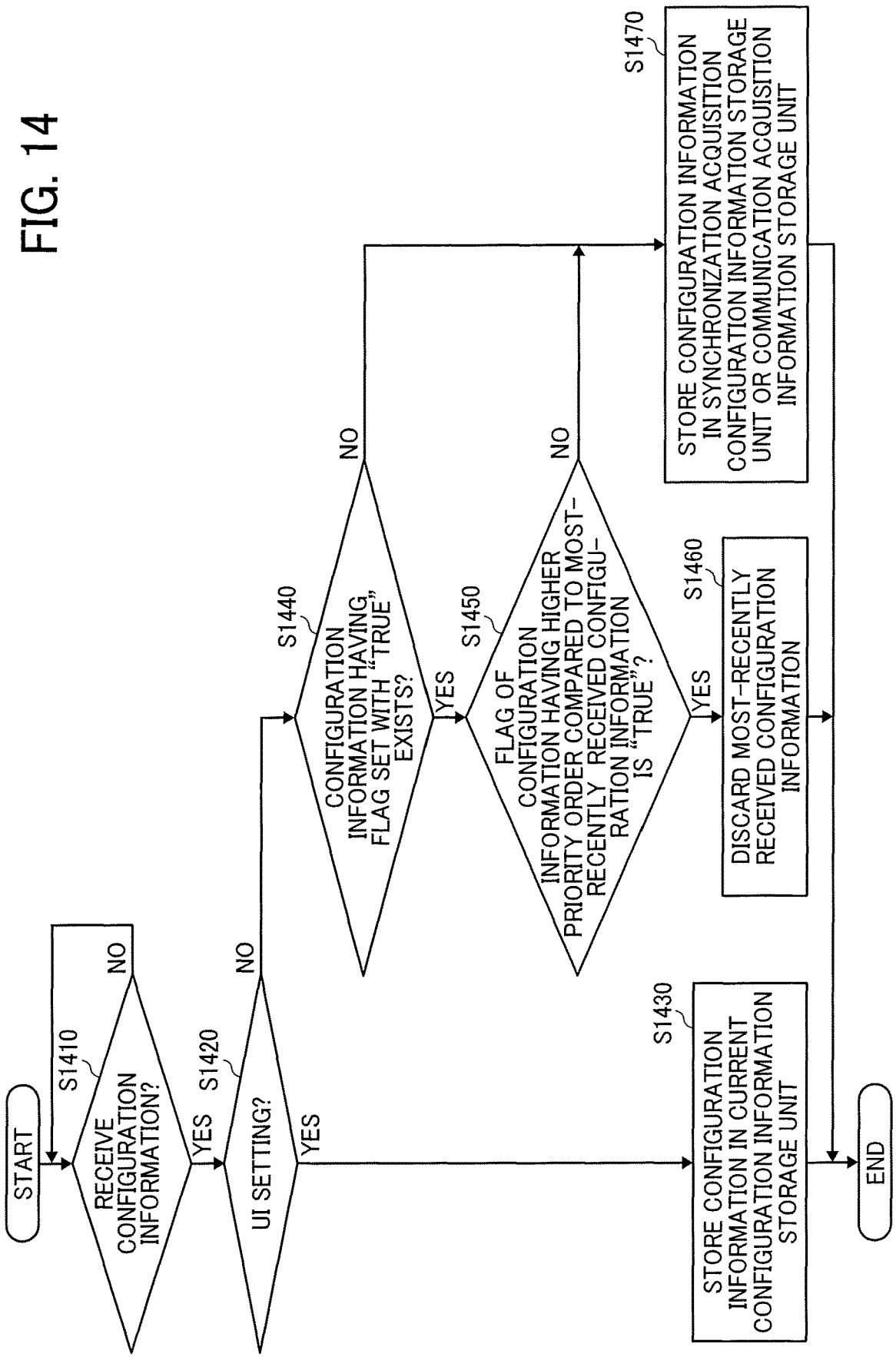
FIG. 14 illustrates an example of a flowchart showing the steps of a process when an electronic information board (synchronization partner) receives configuration information.

Processing when Receiving Configuration Information:

FIG. 14 illustrates an example of a flowchart showing the steps of a process when the electronic information board 2 (synchronization partner) receives the configuration information. The sequence of FIG. 14 starts when the configuration information is received by any one of the three information reception units.

The priority determining unit 17 of the electronic information board 2 (synchronization partner) determines whether the configuration information is received by any one of the three information reception units (S1410).

If the determination in step S1410 is YES, the priority determining unit 17 determines whether the configuration information is received by using the UI setting (S1420).

If the configuration information is received by using the UI setting (S1420: YES), the configuration information is applied to the electronic information board 2 (synchronization partner) in real time, and the priority determining unit 17 stores the configuration information in the current configuration information storage unit 192 (S1430).

If the configuration information is not received by using the UI setting (S1420: NO), the priority determining unit 17 checks whether the configuration information having a flag of "TRUE" already exists in the electronic information board 2 (synchronization partner) (S1440).

If the configuration information having the flag of "TRUE" does not yet exist (S1440: NO), the configuration information received in S1410 can be set, and the priority determining unit 17 stores the configuration information received in S1410 in the synchronization acquisition configuration information storage unit 196 or the communication acquisition information storage unit 193 (S1470). That is, the configuration information received in S1410 is stored in the storage unit depending on the value of the flag set for each of the information reception units.

If the configuration information having the flag of "TRUE" already exists (S1440: YES), the sequence proceeds to step S1450, and the configuration information received in S1410 may be discarded depending on the priority order set for the information reception unit. Specifically, in S1450, the priority determining unit 17 checks whether the flag of one configuration information set with the higher priority order compared to the most-recently received another configuration information is "TRUE."

If the determination in step S1450 is YES, the priority determining unit 17 discards the most-recently received configuration information because another configuration information has been already received by using the information reception unit set with the higher priority order (S1460).

If the determination in step S1450 is NO, the priority order of the most-recently received configuration information becomes the highest priority order, and thereby the priority determining unit 17 stores the configuration information received in S1410 in the synchronization acquisition configuration information storage unit 196 or the communication acquisition information storage unit 193 (S1470). That is, the configuration information received in S1410 is stored in the storage unit depending on the value of the flag set for each of the information reception units.

That is, if the electronic information board 2 receives the configuration information "X" using one information reception unit set with the higher priority order after receiving the configuration information "Y" using another information reception unit set with the lower priority order, the electronic information board 2 stores the configuration information "X" received by using the one information reception unit set with the higher priority order (i.e., most-recently received configuration information), and if the electronic information board 2 receives the configuration information "Y" using another information reception unit set with the lower priority order after receiving the configuration information "X" using the one information reception unit set with the higher priority order, the electronic information board 2 discards the configuration information "Y" received by using another information reception unit set with the lower priority order (i.e., most-recently received configuration information). With this processing, the configuration information received by the information reception unit set with the high priority order can be used when the electronic information board 2 is reactivated for the next time.

Figure 15:
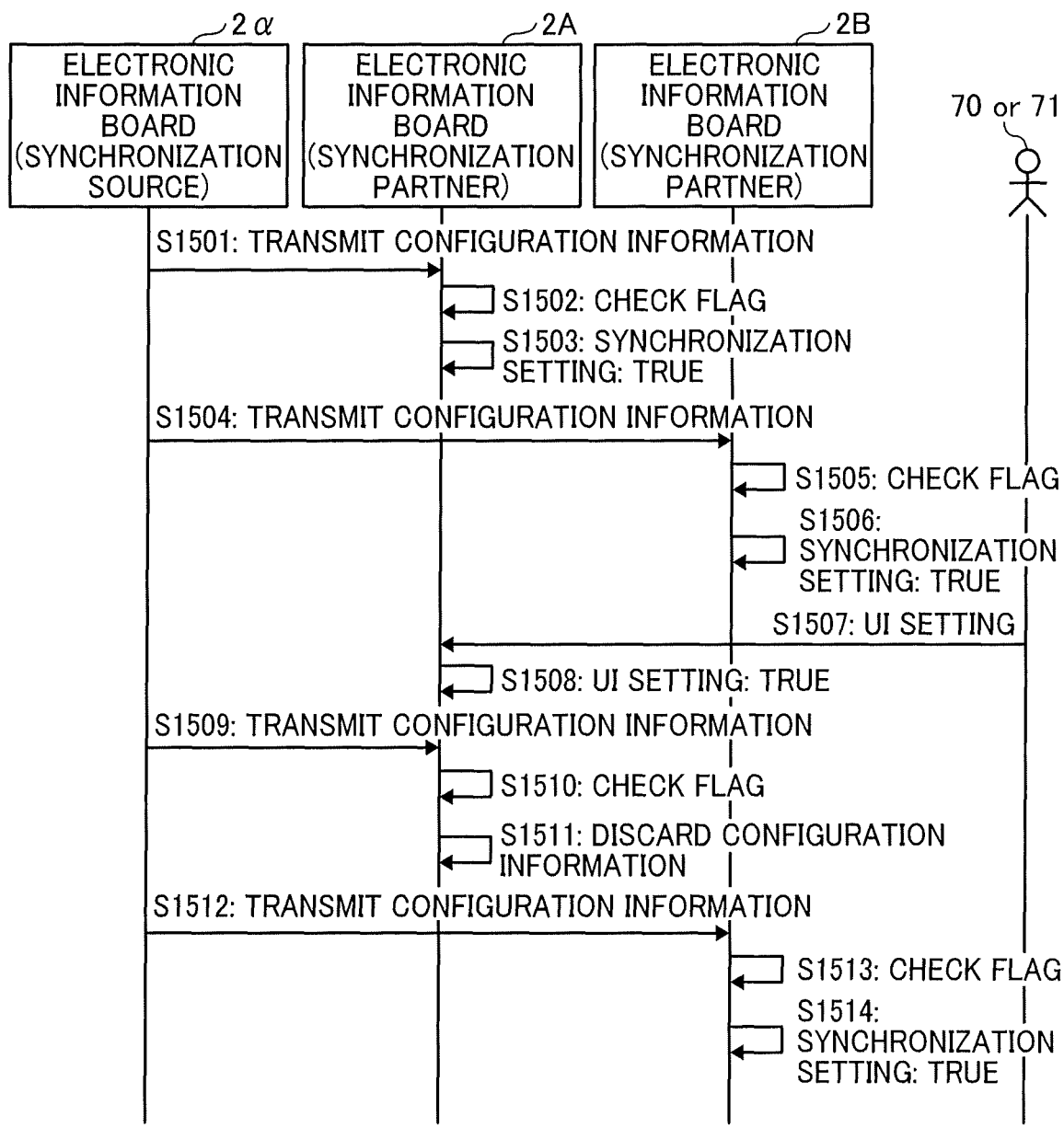
FIG. 15 illustrates an example of a sequence diagram of a procedure when an electronic information board in the communication system synchronizes configuration information (synchronization setting→UI setting→synchronization setting)

Procedure:
Synchronization Setting→UI Setting→Synchronization Setting:

FIG. 15 illustrates an example of a sequence diagram of a procedure when the electronic information board 2 of the communication system 100 synchronizes the configuration information.

S1501, S1504: When the current time becomes the synchronization timing, the configuration information transmitting unit 14 of the electronic information board 2α (synchronization source) transmits the configuration information using an IP address registered in the synchronization partner list as a destination of the configuration information.

S1502, S1505: The priority determining unit 17 of the electronic information boards 2A and 2B (synchronization partner) checks whether a flag of the UI setting set with the higher priority order, compared to the priority order set for the synchronization setting, is "TRUE." In steps S1502 and S1505, it is assumed that the flag of the UI setting set with the higher priority order, compared to the priority order set for the synchronization setting, is "FALSE." Then, the priority determining unit 17 of the electronic information boards 2A and 2B (synchronization partner) stores the configuration information in the synchronization acquisition configuration information storage unit 196.

S1503, S1506: The priority determining unit 17 of the electronic information boards 2A and 2B (synchronization partner) sets the flag of the synchronization setting to "TRUE."

S1507: Then, an administrator sets the configuration information of the electronic information board 2A (synchronization partner) using the UI setting. Then, the configuration information reception unit 11 of the electronic information board 2A (synchronization partner) receives and stores the configuration information in the current configuration information storage unit 192.

S1508: The priority determining unit 17 of the electronic information board 2A (synchronization partner) sets the flag of UI setting to "TRUE."

Then, it is assumed that the current time becomes the next synchronization timing without reactivating the electronic information boards 2A and 2B (synchronization partner).

S1509, S1512: When the current time becomes the next synchronization timing, the configuration information transmitting unit 14 of the electronic information board 2α (synchronization source) transmits the configuration information using the TP address registered in the synchronization partner list as a transmission destination of the configuration information.

S1510, S1513: The priority determining unit 17 of the electronic information boards 2A and 2B (synchronization partner) checks whether the flag of the UI setting set with the higher priority order, compared to the priority order set for the synchronization setting, is "TRUE." In this example case, the flag of UI setting is set "TRUE" for the electronic information board 2A (synchronization partner) as indicated in S1508.

S1511: Since the flag of the UI setting of the electronic information board 2A (synchronization partner) is "TRUE," the priority determining unit 17 discards the configuration information transmitted from the electronic information board 2α (synchronization source).

S1514: The priority determining unit 17 of the electronic information board 2B (synchronization partner) sets the flag of synchronization setting to "TRUE" (i.e., maintains a status of "TRUE" for the flag of the synchronization setting set in S1506). Then, the synchronization information reception unit 16 of the electronic information board 2B (synchronization partner) stores the configuration information, transmitted from the electronic information board 2α (synchronization source) in step S1512, in the synchronization acquisition configuration information storage unit 196.

As above described, by setting the UI setting to "TRUE," the configuration information of the synchronization setting can be discarded from the electronic information board 2A (synchronization partner). Therefore, even when the electronic information board 2A (synchronization partner) is reactivated, the electronic information board 2A can be operated under a condition that the UI setting is valid. Since the flag of the UI setting becomes "FALSE" by the reactivation, if new configuration information is received by using the synchronization setting after the reactivation, the electronic information board 2A (synchronization partner) can be synchronized with the new configuration information received from the electronic information board 2α (synchronization source).

Synchronization Setting→Web Setting→Synchronization Setting:

The relationship between the web setting set with the higher priority order and the synchronization setting set with the lower priority order is similar to the relationship of FIG. 15.

Figure 16:
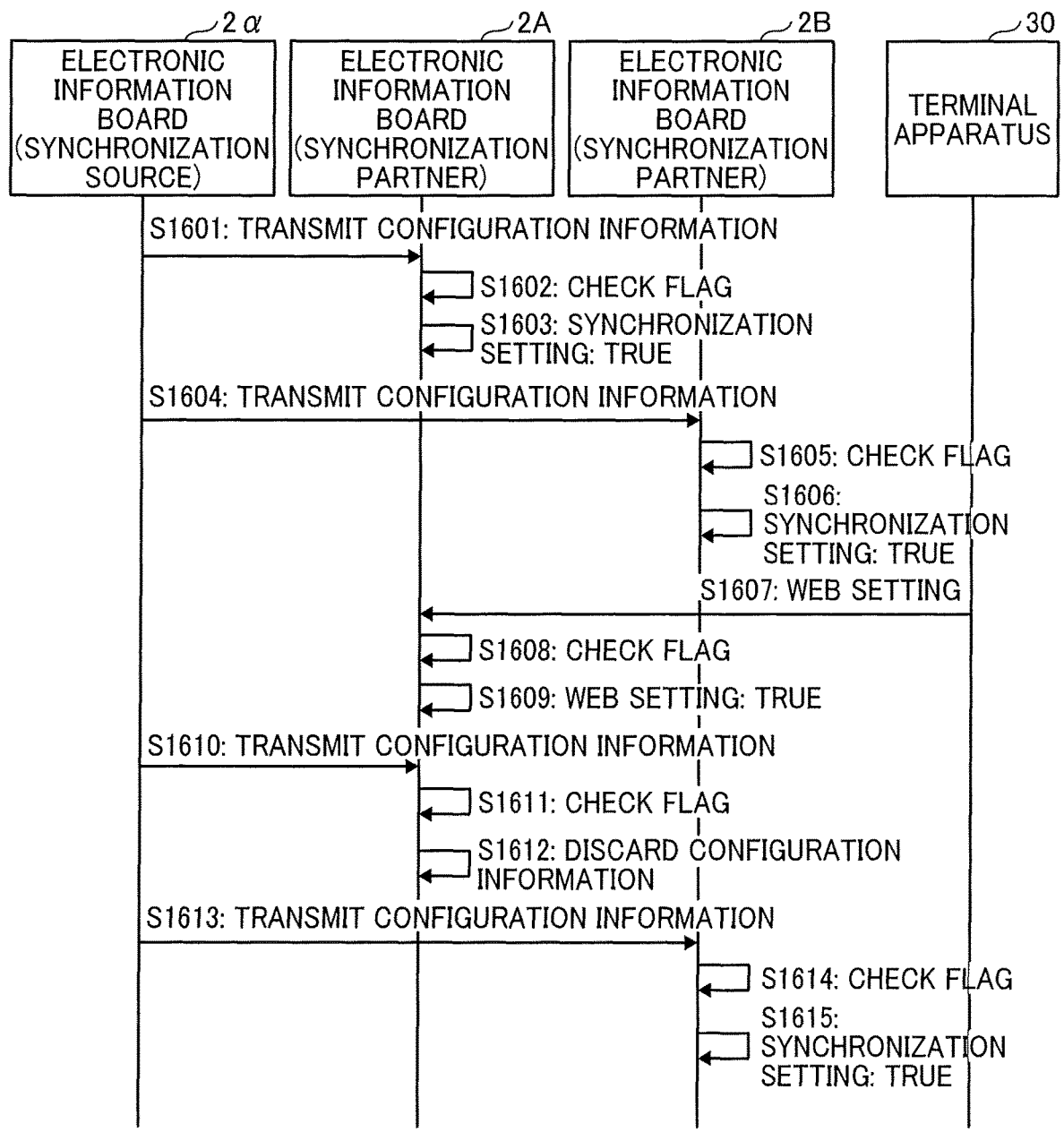
FIG. 16 illustrates an example of a sequence diagram of a procedure when an electronic information board in the communication system synchronizes configuration information (synchronization setting→web setting→synchronization setting)

FIG. 16 illustrates an example of a sequence diagram of a procedure when the electronic information board 2 in the communication system 100 synchronizes the configuration information. In FIG. 16, the difference from FIG. 15 is described. The sequence of steps S1601 to S1606 is similar to the sequence of steps S1501 to S1506 of FIG. 15.

As illustrated in FIG. 16, in step S1607, the terminal apparatus 30 sets the configuration information in the electronic information board 2A (synchronization partner) using the web setting. Then, in step S1609, the flag of the web setting is set "TRUE."

In step S1610, the electronic information board 2α (synchronization source) transmits new configuration information to the electronic information board 2A (synchronization partner).

In step S1611, the priority determining unit 17 of the electronic information boards 2A (synchronization partner) checks a flag of the web setting and a flag of the synchronization setting. Since the priority order of the web setting is set higher than the priority order of the synchronization setting, in step S1612, the electronic information board 2A (synchronization partner) discards the configuration information transmitted by using the synchronization setting in step S1610. Therefore, the configuration information received in step S1607 using the web setting is applied to the electronic information board 2A (synchronization partner) by performing the reactivation of the electronic information board 2A (synchronization partner).

As above described, when the electronic information board 2 (synchronization partner) receives the configuration information "X" by one information reception unit set with the high priority order before receiving the configuration information "Y" using another information reception unit set with the lower priority order, the electronic information board 2 (synchronization partner) preferentially applies the configuration information "X" received by the one information reception unit set with the high priority order.

Web Setting→UI Setting→Web Setting:

The relationship between the UI setting set with the higher priority order and the web setting set with the lower priority order is also similar to the relationship of FIG. 15.

FIG. 17 illustrates an example of a sequence diagram of a procedure when the electronic information board 2 in the communication system 100 synchronizes the configuration information.

S1701: When an administrator operates the terminal apparatus 30, the terminal apparatus 30 transmits the configuration information to the electronic information board 2A (synchronization partner). Then, the configuration information reception unit 12 of the electronic information board 2A (synchronization partner) receives the configuration information.

S1702: The priority determining unit 17 of the electronic information board 2A (synchronization partner) checks whether a flag of the UI setting set with the higher priority order, compared to the priority order set for the web setting, is "TRUE." In this case, it is assumed that the flag of the UI setting is "FALSE." Then, the priority determining unit 17 instructs the communication acquisition information storage unit 193 to store the configuration information received from the terminal apparatus 30 in step S1701.

S1703: The priority determining unit 17 of the electronic information board 2A (synchronization partner) sets the flag of the web setting to "TRUE."

S1704: Then, the administrator sets the configuration information of the electronic information board 2A (synchronization partner) using the UI setting. The configuration information reception unit 11 of the electronic information board 2A (synchronization partner) receives the configuration information using the UI setting, and then the priority determining unit 17 stores the configuration information received by using the UI setting in the current configuration information storage unit 192.

S1705: Then, the priority determining unit 17 of the electronic information board 2A (synchronization partner) sets the flag of UI setting to "TRUE."

Then, it is assumed that the terminal apparatus 30 transmits new configuration information without reactivating the electronic information board 2A (synchronization partner).

S1706: When the administrator operates the terminal apparatus 30, the terminal apparatus 30 transmits the new configuration information to the electronic information board 2A (synchronization partner). Then, the configuration information reception unit 12 of the electronic information board 2A (synchronization partner) receives the new configuration information.

S1707: The priority determining unit 17 of the electronic information board 2A (synchronization partner) checks whether the flag of the UI setting set with the higher priority order, compared to the priority order set for the web setting, is "TRUE."

S1708: Since the flag of the UI setting of the electronic information board 2A (synchronization partner) is "TRUE" as indicated in S1705, the priority determining unit 17 discards the new configuration information received from the terminal apparatus 30 in step S1706.

As above described, in a case of the above described relationship between the web settings and UI setting, when the electronic information board 2 receives the configuration information "X" by one information reception unit set with the high priority order before receiving the configuration information "Y" using another information reception unit set with the lower priority order, the electronic information board 2 can preferentially apply the configuration information "X" received by the one information reception unit set with the high priority order.

Figure 18A:
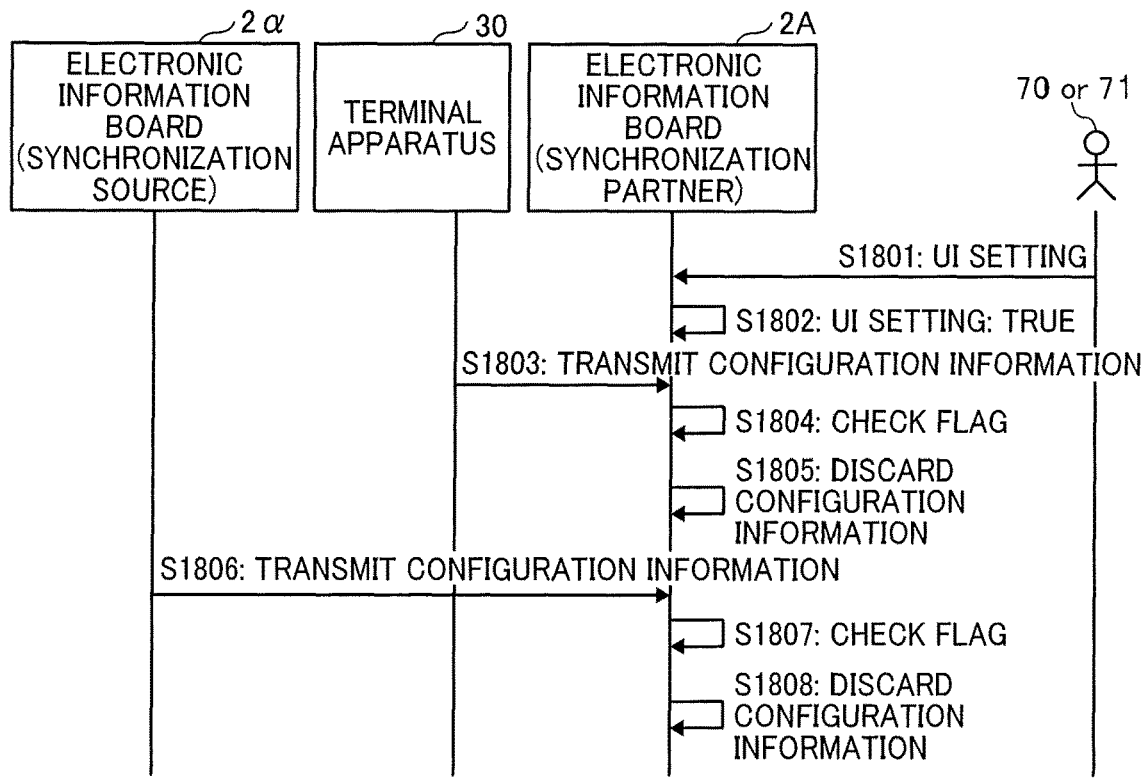
FIG. 18A illustrates an example of a sequence diagram of a procedure when an electronic information board in the communication system synchronizes configuration information (UI setting→web setting→synchronization setting)

UI Setting→Web Setting→Synchronization Setting:

Further, when the configuration information is transmitted by using the UI setting, the web setting and the synchronization setting, respectively set with the higher priority order to the lower priority order, in the order from the highest priority order to the lowest priority order, the configuration information transmitted by using the UI setting alone is received, and the configuration information transmitted by using the web setting and the synchronization setting are discarded as illustrated in FIG. 18A.

FIG. 18A illustrates an example of a sequence diagram of a procedure when the electronic information board 2 in the communication system 100 synchronizes the configuration information.

S1801: An administrator sets the configuration information of the electronic information board 2A (synchronization partner) using the UI setting. The configuration information reception unit 11 of the electronic information board 2A (synchronization partner) receives the configuration information using the UI setting, and stores the configuration information in the current configuration information storage unit 192.

S1802: The electronic information board 2A (synchronization partner) sets the flag of the UI setting to "TRUE."

S1803: When the administrator operates the terminal apparatus 30, the terminal apparatus 30 transmits the configuration information to the electronic information board 2A (synchronization partner). Then, the configuration information reception unit 12 of the electronic information board 2A (synchronization partner) receives the configuration information.

S1804: The priority determining unit 17 of the electronic information board 2A (synchronization partner) checks whether the flag of the UI setting set with the higher priority order, compared to the priority order set for the web setting, is "TRUE."

S1805: Since the flag of the UI setting is TRUE (see S1802), the priority determining unit 17 of the electronic information board 2A (synchronization partner) discards the configuration information received in step S1803.

S1806: Then, the electronic information board 2α (synchronization source) transmits the configuration information to the electronic information board 2A (synchronization partner). Then, the synchronization information reception unit 16 of the electronic information board 2A (synchronization partner) receives the configuration information.

S1807: The priority determining unit 17 of the electronic information board 2A (synchronization partner) checks whether the flag of the UI setting set with the higher priority order, compared to the priority order set for the synchronization setting, is "TRUE."

S1808: Since the flag of the UI setting is "TRUE" (see S1802), the priority determining unit 17 of the electronic information board 2A (synchronization partner) discards the configuration information received in step S1806.

As above described, the configuration information set by the UI setting set with the highest priority order becomes valid. If the configuration information received by using the UI setting becomes invalid, the configuration information received by using the web setting becomes valid.

Figure 18B:
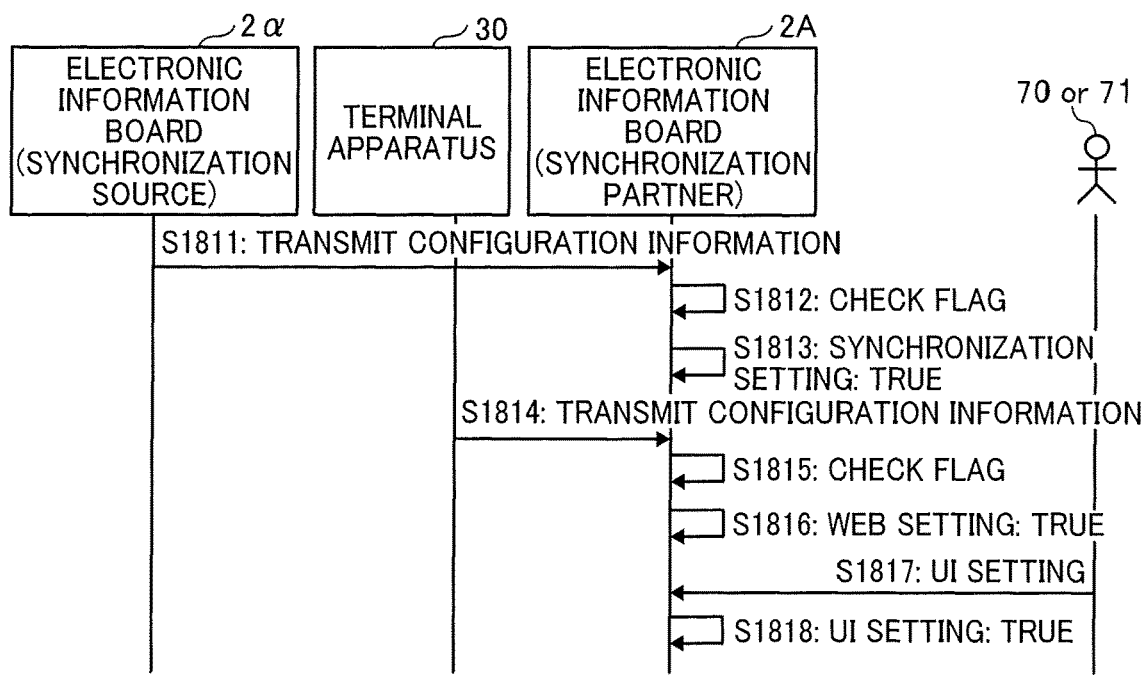
FIG. 18B illustrates an example of a sequence diagram of a procedure when an electronic information board in the communication system synchronizes configuration information (synchronization setting→web setting→UI setting)

Synchronization Setting→Web Setting→UI Setting:

When the configuration information is transmitted by using the synchronization setting, the web setting and the UI setting, respectively set with the lower priority order to the higher priority order, in the order from the lowest priority order to the highest priority order, all of the configuration information can be received and accepted as valid as illustrated in FIG. 18B.

FIG. 18B illustrates an example of a sequence diagram of a procedure when the electronic information board 2 of the communication system 100 synchronizes the configuration information.

S1811: The electronic information board 2α (synchronization source) transmits the configuration information to the electronic information board 2A (synchronization partner), and the synchronization information reception unit 16 of the electronic information board 2A (synchronization partner) receives the configuration information.

S1812: The priority determining unit 17 of the electronic information board 2A (synchronization partner) checks whether a flag of the web setting and a flag of the UI setting set with the higher priority order, compared to the priority order set for the synchronization setting, are "TRUE." In this case, it is assumed that the flag of the web setting and the flag of the UI setting are "FALSE."

S1813: Since the flag of the web setting and the flag of the UI setting are "FALSE," the priority determining unit 17 of the electronic information board 2A (synchronization partner) stores the configuration information received in S1811 from the electronic information board 2α (synchronization source) in the synchronization acquisition configuration information storage unit 196, and sets the flag of the synchronization setting to "TRUE."

S1814: When an administrator operates the terminal apparatus 30, the terminal apparatus 30 transmits the configuration information to the electronic information board 2A (synchronization partner), and the configuration information reception unit 12 of the electronic information board 2A (synchronization partner) receives the configuration information received by using the web setting.

S1815: The priority determining unit 17 of the electronic information board 2A (synchronization partner) checks whether the flag of the UI setting set with the higher priority order, compared to the priority order set for the web setting, is "TRUE."

S1816: Since the flag of the UI setting is "FALSE," the priority determining unit 17 of the electronic information board 2A (synchronization partner) stores the configuration information received in S1814 from the terminal apparatus 30 in the communication acquisition information storage unit 193, and sets the flag of the web setting to "TRUE."

S1817: Then, the administrator sets the configuration information to the electronic information board 2A (synchronization partner) using the UI setting. The configuration information reception unit 11 of the electronic information board 2A (synchronization partner) receives the configuration information received by using the UI setting, and stores the configuration information received by using the UI setting in the current configuration information storage unit 192.

S1818: The priority determining unit 17 of the electronic information board 2A (synchronization partner) sets the flag of UI setting to "TRUE."

As above described, depending on the sequential order of receiving the plurality of configuration information using the different information reception units, the plurality of configuration information can be stored in the electronic information board 2 (synchronization partner). In this case, the configuration information having the most-recent date/time is applied to the electronic information board 2 (synchronization partner) when the electronic information board 2 (synchronization partner) is reactivated.

Figure 19:
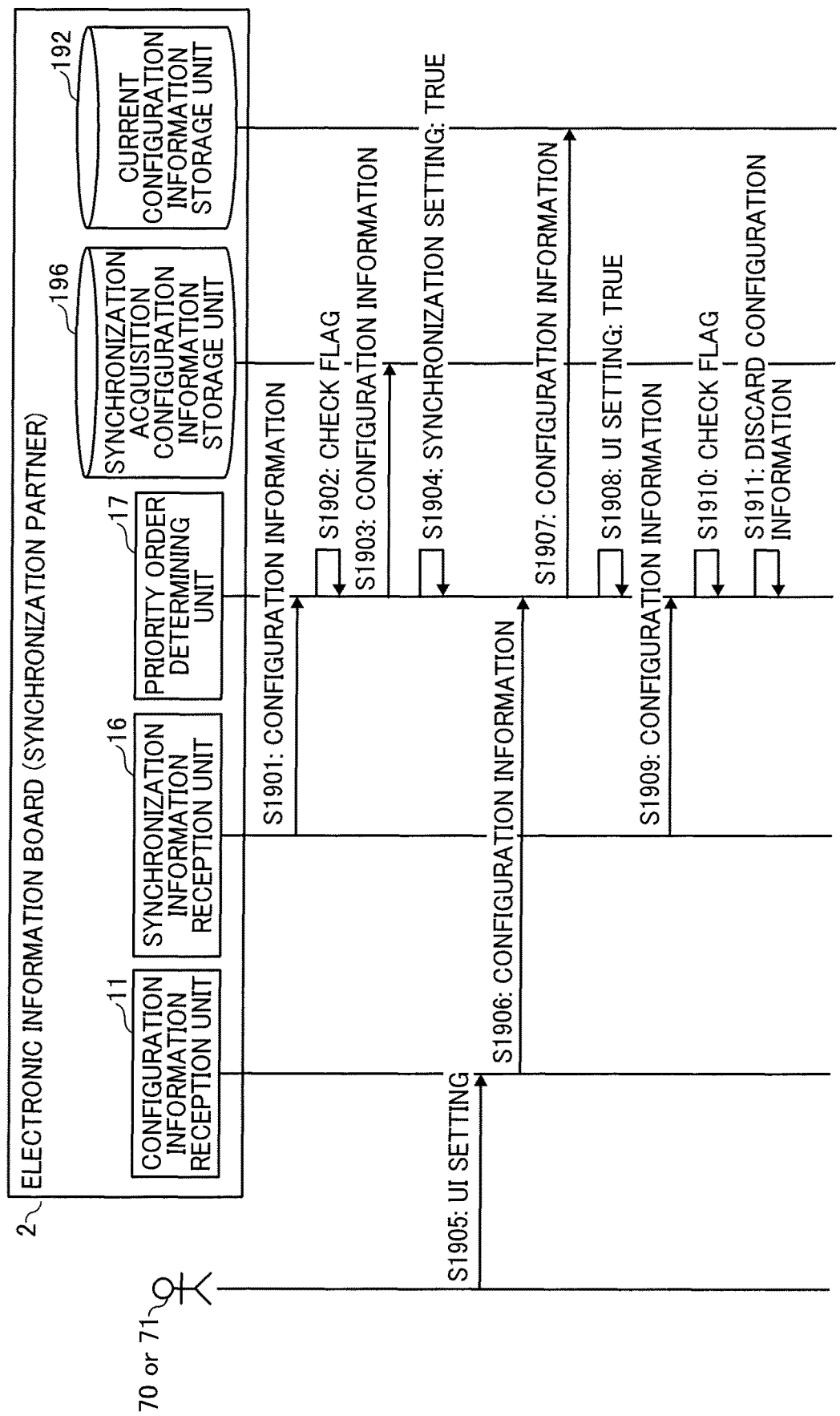
FIG. 19 illustrates an example of a sequence diagram of an operation of an electronic information board used as a synchronization partner.

Operation of Electronic Information Board (Synchronization Partner):

FIG. 19 illustrates an example of a sequence diagram of a procedure for describing an operation of the electronic information board 2 used as the synchronization partner. The sequence in FIG. 19 corresponds mostly to the sequence illustrated in FIG. 15.

S1901: The synchronization information reception unit 16 of the electronic information board 2 (synchronization partner) receives the configuration information from the electronic information board 2α (synchronization source). Then, the synchronization information reception unit 16 transfers the received configuration information to the priority determining unit 17.

S1902: The priority determining unit 17 checks a flag. Since the configuration information is received by using the synchronization setting, the priority determining unit 17 checks whether the flag of the web setting and the fag of the UI setting set with the higher priority order, compared to the priority order set for the synchronization setting, is "FALSE." In this example case, it is assumed that the flag of the web setting and the flag of the UI setting are "FALSE."

S1903: Since the priority determining unit 17 has not yet received the configuration information using the web setting and the UI setting set with the higher priority order, compared to the priority order set for the synchronization setting, the priority determining unit 117 stores the configuration information, received in S1901 from the electronic information board 2α (synchronization source), in the synchronization acquisition configuration information storage unit 196.

S1904: Then, the priority determining unit 17 sets a flag of the configuration information received by using the synchronization setting in S1901 to "TRUE."

S1905: Then, an administrator sets the configuration information to the electronic information board 2 (synchronization partner) using the UI setting.

S1906: The configuration information reception unit 11 of the electronic information board 2 (synchronization partner) receives the configuration information using the UI setting, and transfers the configuration information to the priority determining unit 17.

S1907: Since the configuration information received by using the UI setting is applied to the electronic information board 2 (synchronization partner) in real time, the priority determining unit 17 stores the configuration information received in S1906 in the current configuration information storage unit 192. Therefore, the checking of the flag of the configuration information is not required.

S1908: The priority determining unit 17 sets the flag of the configuration information received by using the UI setting to "TRUE."

S1909: The synchronization information reception unit 16 of the electronic information board 2 (synchronization partner) receives new configuration information from the electronic information board 2α (synchronization source). Then, the synchronization information reception unit 16 transfers the received new configuration information to the priority determining unit 17.

S1910: The priority determining unit 17 checks a flag. Since the new configuration information is received by using the synchronization setting in S1909, the priority determining unit 17 determines whether the flag of the web setting and the flag of the UI setting set with the higher priority order, compared to the priority order set for the synchronization setting, is "FALSE." In this case, the priority determining unit 17 confirms that the flag of UI setting is "TRUE" as indicated in S1908.

S1911: The priority determining unit 17 discards the configuration information received in step S1909 from the electronic information board 2α (synchronization source) because the flag of the UI setting set with the higher priority order, compared to the priority order set for the synchronization setting, is "TRUE" as confirmed in S1910.

Figure 20:
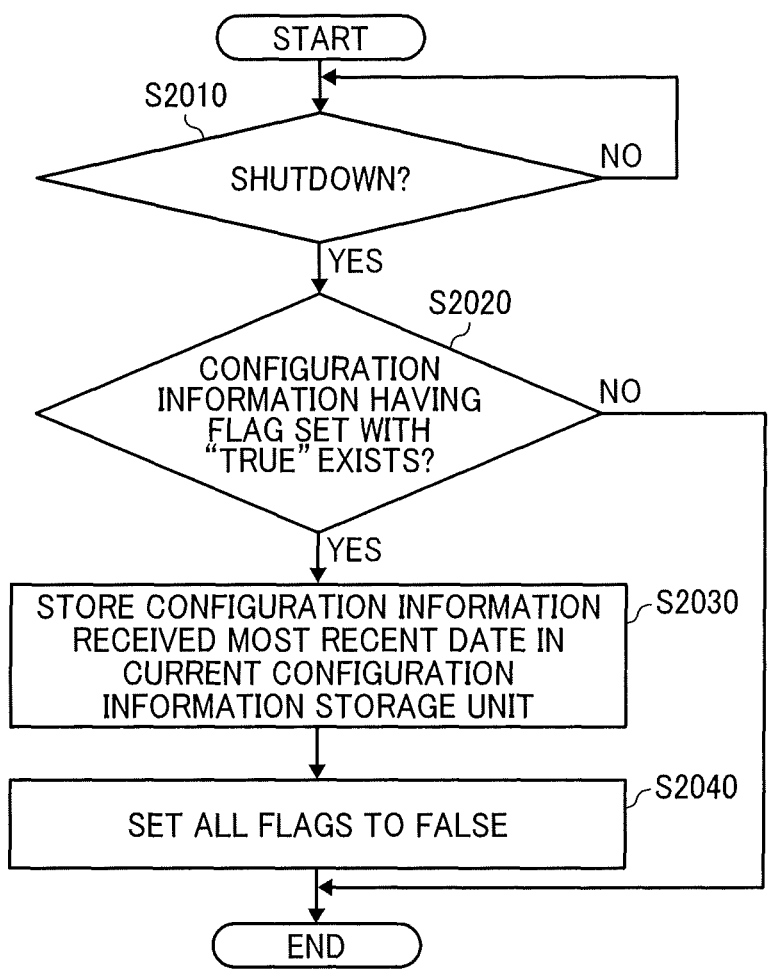
FIG. 20 illustrates an example of a flowchart illustrating a procedure when an electronic information board used as a synchronization partner applies configuration information.

Application of Configuration Information:

FIG. 20 illustrates an example of a flowchart illustrating a procedure when the electronic information board 2 (synchronization partner) applies the configuration information. In the description of FIG. 20, it is assumed that the configuration information is applied to the electronic information board 2 (synchronization partner) by shutting down and reactivating the electronic information board 2 (synchronization partner). The procedure for applying the configuration information may be the same for the electronic information board 2α and the electronic information board 2.

The configuration information application unit 15 of the electronic information board 2 (synchronization partner) checks whether the electronic information board 2 is shutdown (S2010). The shutdown may be initiated by a user or at a reactivation timing set in the synchronization partner setting policy storage unit 195.

The configuration information application unit 15 checks whether the configuration information having a flag of "TRUE" exists during the shutdown processing of the electronic information board 2 (S2020). The shutdown processing is a sequence of storing data not yet saved and/or closing a file.

If the configuration information having the flag of "TRUE" does not exist (S2020: NO), the sequence of FIG. 20 ends because the configuration information was not received when the electronic information board 2 was being activated before the shutdown.

If the configuration information having the flag of "TRUE" exists (S2020: YES), the configuration information application unit 15 stores the configuration information received by using the information reception unit at the most-recent date/time in the current configuration information storage unit 192 (S2030). In a case that the information reception unit used at the most-recent date/date is the UI setting, the configuration information is already stored in the current configuration information storage unit 192, and thereby no further processing is required.

With this configuration, when the electronic information board 2 (synchronization partner) is reactivated for the next time, the electronic information board 2 (synchronization partner) can be operated based on the configuration information stored in the current configuration information storage unit 192.

Then, the configuration information application unit 15 sets all flags to "FALSE" (S2040). With this configuration, the electronic information board 2 (synchronization partner) can receive the configuration information using the synchronization setting or the web setting during the next activation timing as valid information.

Validity of Configuration Information:

Since the configuration information is applied and the flag of the configuration information returns to "FALSE" by performing the reactivation, the configuration information received by using each information reception unit is applied at the following timing.

UI setting: right after performing the setting operation until the next reactivation.

Web setting and synchronization setting: from the first-time reactivation until the second-time reactivation.

If new configuration information is not received during one activation period such as a period from the first-time reactivation to the second-time reactivation, the configuration information set before the first-time reactivation is being applied even after the second-time reactivation. FIG. 21 describes the reception timing of the configuration information, and the configuration information applied by the reactivation.

FIG. 21 illustrates examples of diagrams describing the reception timing of the configuration information, and the configuration information that is applied by reactivating the electronic information board 2 (synchronization partner).

Figure 21A:
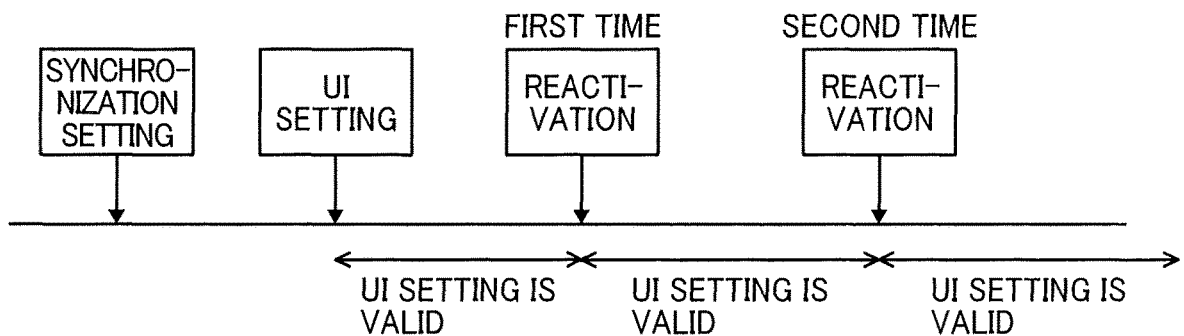
FIGS. 21A, 21B, and 21C illustrate examples of diagrams describing reception timing of configuration information, and configuration information applied by reactivating an electronic information board used as a synchronization partner.

In an example case of FIG. 21A, after the configuration information is received by using the synchronization setting, the configuration information is received by using the UI setting. Since the configuration information received by using the UI setting is applied to the electronic information board 2 (synchronization partner) right after the setting, the UI setting becomes valid or effective until the first-time reactivation after setting the configuration information received by using the UI setting. At the first-time reactivation, the flag of synchronization setting and the flag of UI setting are "TRUE," in which the UI setting having the most-recent (or latest) set date/time is applied, which means the UI setting is being kept applied. Then, all flags are set to "FALSE." Since no new configuration information has not been received from the first-time reactivation until the second-time reactivation, the UI setting is being applied even after the second-time reactivation.

Figure 21B:
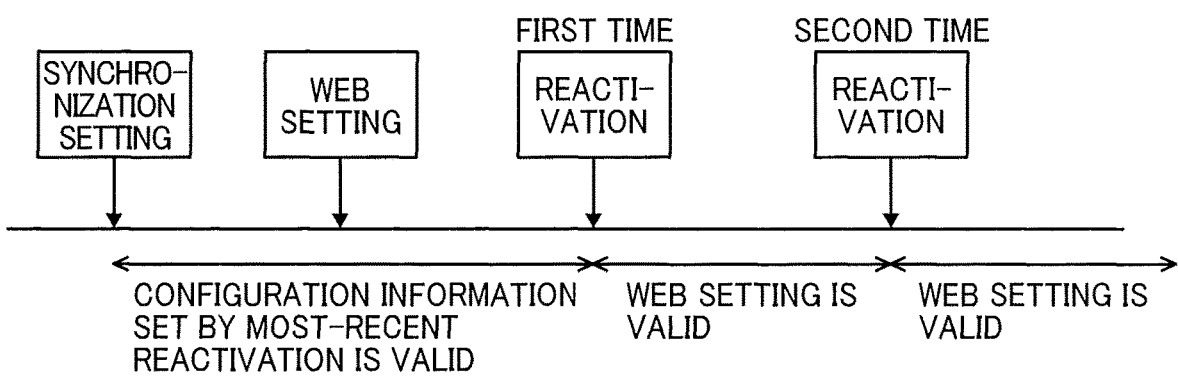

In an example case of FIG. 21B, after the configuration information is received by using the synchronization setting, the configuration information is received by using the web setting. Since the synchronization setting and the web setting are applied to the electronic information board 2 (synchronization partner) by the reactivation, the configuration information received at the most-recent (or latest) set date/time is being valid or effective until the first-time reactivation. At the first-time reactivation, the flag of synchronization setting and the flag of web setting are "TRUE," in which the web setting having the most-recent or latest set date/time is applied. Then, all flags are set to "FALSE" at the first-time reactivation. Since no new configuration information has not been received from the first-time reactivation until the second-time reactivation, the web setting is being applied even after the second-time reactivation.

Figure 21C:
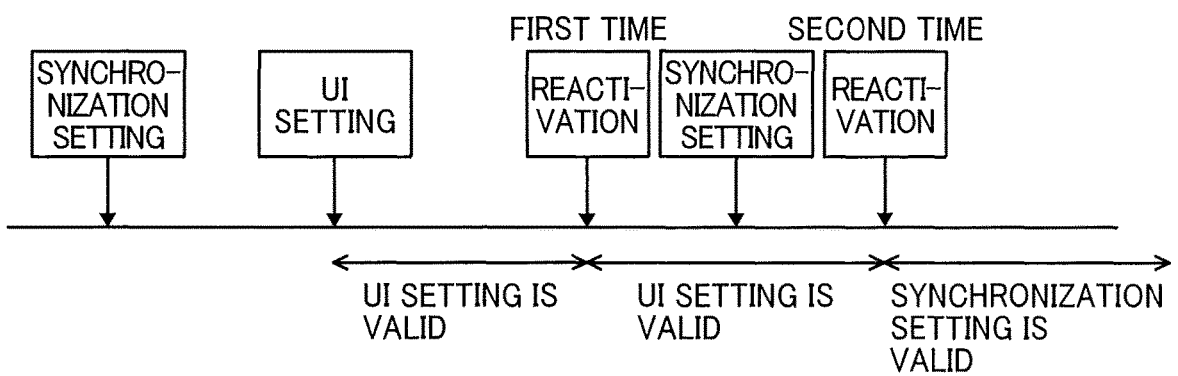

In an example case of FIG. 21C, after the configuration information is received by using the synchronization setting, the configuration information is received by using the UI setting. Since the UI setting is applied to the electronic information board 2 (synchronization partner) right after the setting, the UI setting becomes valid or effective until the first-time reactivation after setting the configuration information received by using the UI setting. At the first-time reactivation, the flag of synchronization setting and the flag of UI setting are "TRUE," in which the UI setting having the most-recent or latest set date/time is applied, which means the UI setting is being kept applied. Then, all flags are set to "FALSE" at the first-time reactivation. Since new configuration information is received by using the synchronization setting from the first-time reactivation until the second-time reactivation. the flag of synchronization setting flag is set to "TRUE." Therefore, after the second-time reactivation, the configuration information of the synchronization setting is applied.

As to the above described communication system 100 of the first embodiment, the priority order is set for each of the information reception units. When the configuration information is received by using the information reception unit other than the information reception unit related to the UI setting, the configuration information received by using the information reception unit set with the lower priority order is discarded by referring the flag, with which the configuration information can be applied in the electronic information board 2 based on the priority order set for the plurality of the information reception units rather than simply applying the configuration information received at the most-recent date/time. Therefore, the electronic information board 2 can be operated by then administrator or the user with intended settings.

The priority order of the plurality of the information reception units set in the first embodiment is just one example, and the priority order of the plurality of the information reception units can be changed and set as needed.

Second Embodiment

The first embodiment describes one case that the configuration information set by using the UI setting is applied in real time, but in another case, it is required to apply or discard the configuration information set by using the UI setting based on the priority order. For example, if the synchronization setting is set with the higher priority order, compared to the priority order set for the UI setting, it is required to apply or discard the configuration information using the UI setting based on the priority order.

Figure 22B:
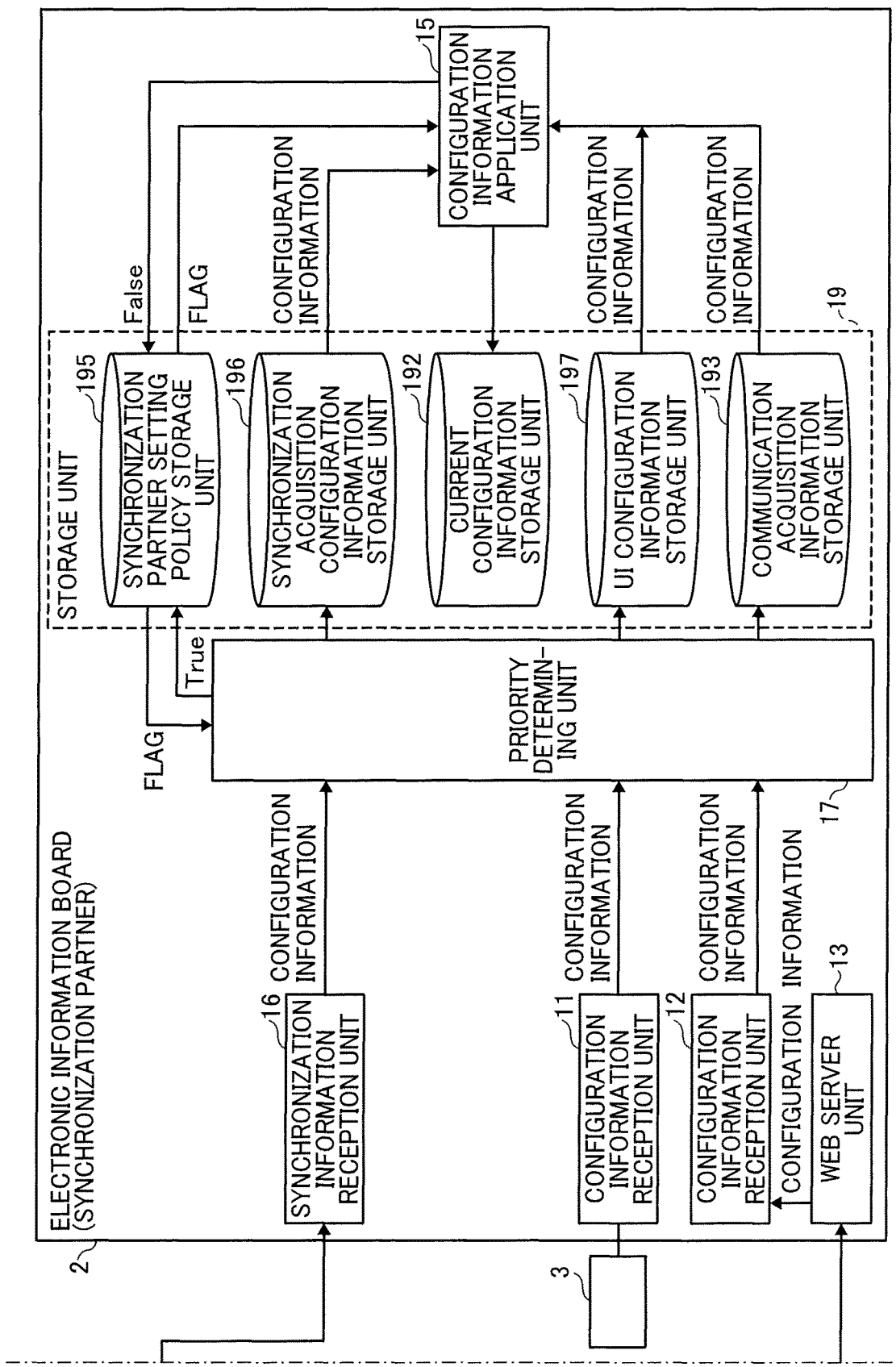

FIGS. 22A and 22B illustrate an example of a functional block diagram of the electronic information board $2\alpha$ (synchronization source), the electronic information board 2 (synchronization partner), and the terminal apparatus 30 of a second embodiment. In the description of the second embodiment, the components designated by the same reference numerals in FIG. 6 perform similar functions, so that only the components used in the second embodiment may be described.

As illustrated in the functional block diagram of FIG. 22, the storage unit 19 of the electronic information board 2 (synchronization partner) includes an UI configuration information storage unit 197. In the second embodiment, the configuration information received via the configuration information reception unit 11 using the UI setting is stored in the UI configuration information storage unit 197 instead of the current configuration information storage unit 192. Therefore, the configuration information received by using the UI setting is not applied in real time, but can be processed based on the priority order as similar to other information reception units.

Figure 23:
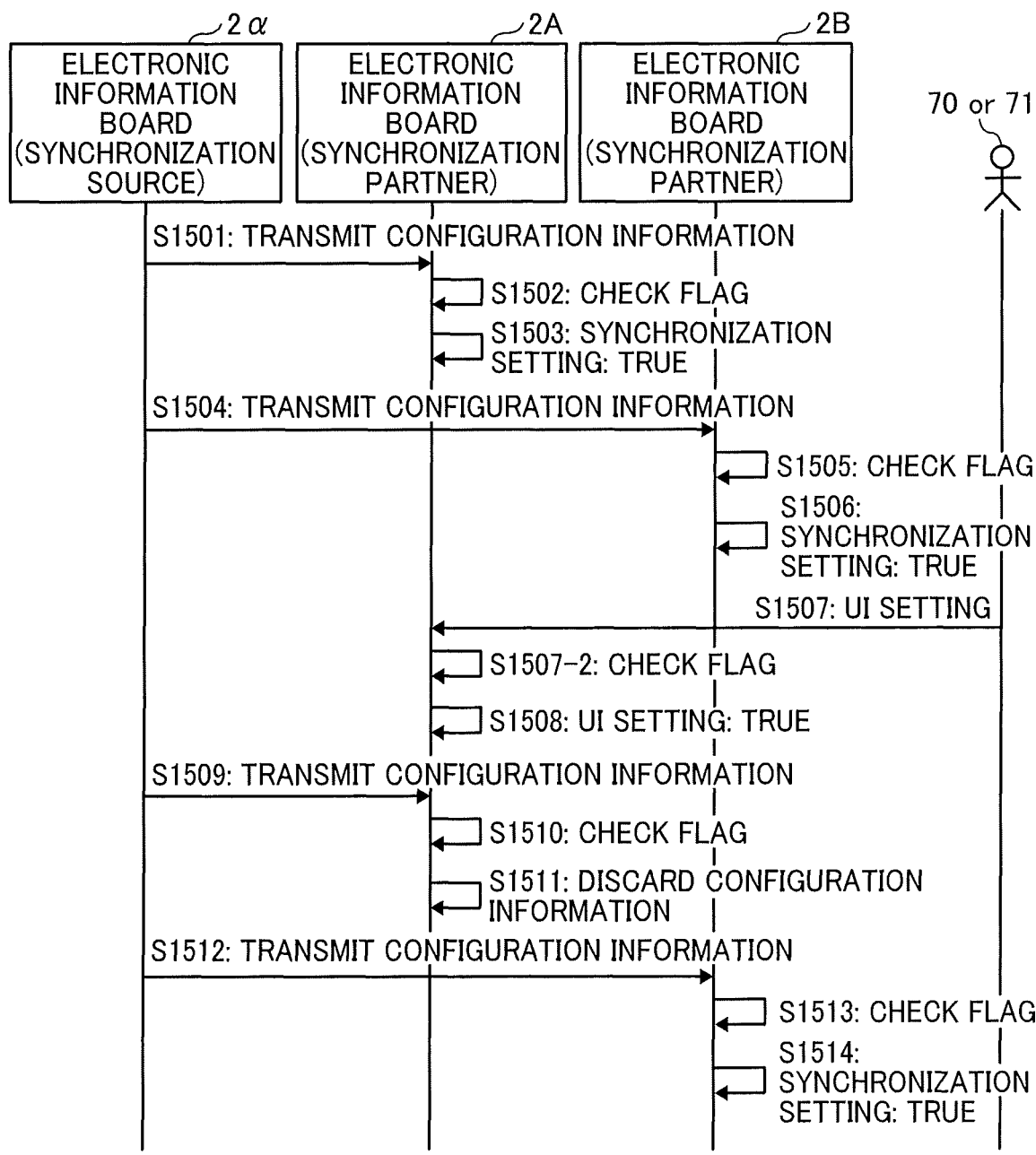
FIG. 23 illustrates an example of a sequence diagram of a procedure when an electronic information board in the communication system synchronizes configuration information in the second embodiment.

Procedure:

Synchronization Setting→UI Setting→Synchronization Setting:

FIG. 23 illustrates an example of a sequence diagram of a procedure when the electronic information board 2 in the communication system 100 synchronizes the configuration information. The description of FIG. 23 mainly describes the difference from FIG. 15.

The sequence of steps S1501 to S1507 is similar to the sequence of steps S1501 to S1507 of FIG. 15.

In step S1507-2, the priority determining unit 17 of the electronic information board 2A (synchronization partner) checks whether a flag of the concerned information reception unit set with the higher priority order, compared to the priority order set for the UI setting, is "TRUE." Therefore, if the concerned information reception unit set with the higher priority order exists and the flag of the concerned information reception unit is "TRUE," the configuration information received by using the UI setting is discarded.

Therefore, as similar to the setting procedure of the first embodiment described with reference to FIG. 15, it can be determined whether the configuration information is stored or discarded for the electronic information board 2A (synchronization partner) based on the priority order and the flag set for the information reception units.

Processing when Receiving Configuration Information:

FIG. 24 illustrates an example of a flowchart illustrating a process when the electronic information board 2 (synchronization partner) receives the configuration information in the second embodiment. In FIG. 24, the difference from FIG. 14 is described. In a case of FIG. 24, steps S1410 to S1430 in FIG. 14 are not required, but steps S1440, S1450, S1460, and S2470 are executed. That is, the configuration information received by using the UI setting is not applied in real time, but the configuration information received by using the UI setting is stored in the UI configuration information storage unit 197 based on the priority order (S2470).

With this processing, the configuration information received by using the information reception unit set with the high priority order can be valid or effective in the next reactivation. The application processing at the time of reactivation is similar to FIG. 20.

As described above, in addition to the effect of the first embodiment, the communication system 100 of the second embodiment can control whether the configuration information received by using the UI setting is applied or not based on the priority order instead of simply applying the UI setting in real time.

Another Applications:

Although the present invention is described using the above described embodiments, the present invention is not limited to the requirements described in the above embodiments. Numerous additional modifications and variations are possible in light of the above teachings. It is therefore to be understood that, within the scope of the appended claims, the disclosure of this patent specification may be practiced otherwise than as specifically described herein.

For example, each function described in the above embodiments can be implemented using one or more processing circuits. The processing circuit includes, for example, a processor implemented by an electronic circuit such as a processor programmed to perform each function by software, and a device to perform the above described each function, such as an application specific integrated circuit (ASIC) designed to perform each of the functions described above, a digital signal processor (DSP), a field programmable gate array (FPGA), a system on a chip (SOC), a graphics processing unit (GPU), a conventional circuit module, and the like.

In the above described embodiments, the number of information reception units is three, but the number of information reception units can be four or more. For example, the electronic information board 2 can include the fourth information reception unit to receive the configuration information stored in the USB memory 5a. Further, the collective setting and the individual setting used for the web setting may be handled by different information reception units.

Further, the same priority order can be set for two or more information reception units. In this case, when the configuration information are received from the information reception units set with the same priority order, the configuration information received at the earliest timing is stored while the configuration information received at the later timing is discarded.

Further, in the above described embodiments, the electronic information board 2 (synchronization partner) discards the configuration information after receiving the configuration information, but not limited thereto. For example, the electronic information board 2 (synchronization partner) can be configured to notify whether the electronic information board 2 (synchronization partner) is to store or discards the configuration information before receiving the configuration information to the electronic information board 2α (synchronization source). If the electronic information board 2α (synchronization source) receives a notice of discarding from the electronic information board 2 (synchronization partner), the electronic information board 2α does not transmit the configuration information to the electronic information board 2 (synchronization partner).

Further, in the above described embodiments, the configuration information is applied by one reactivation, and the flag returns to "FALSE" after the one reactivation, but not limited thereto. For example, a user can set the number of reactivation times when the flag is to be returned to "FALSE." For example, if the electronic information board 2 is designed to reactive automatically one time each day and to return the flag to "FALSE" when the reactivation is performed for seven times, the UI setting can being set valid or effective for a period of one week.

Further, the functional configuration described in FIG. 6 and others is divided according to the main function to facilitate understanding of processing by the electronic information board 2. The present invention is not limited by the method and the name of the processing unit. The processing of the electronic information board 2 can be divided into more processing units according to the processing contents. Further, the processing of the electronic information board 2 can be divided so that one processing unit includes more processing.

Further, one or more of the storage units in the storage unit 19 illustrated FIG. 6 can be disposed on the network.

Further, the current configuration information storage unit 192 is an example of a configuration information storage unit, the configuration information transmitting unit 14 is an example of an information transmission unit, the configuration information reception unit 11, the configuration information reception unit 12, and the synchronization information reception unit 16 are examples of configuration information reception units, the synchronization information reception unit 16 is an example of a first configuration information reception unit, the configuration information reception unit 11 is an example of a second configuration information reception unit, the configuration information reception unit 12 is an example of a third configuration information reception unit, and the configuration information application unit 15 is an example of an application unit. The priority order and flag set for each of the information reception units stored in the synchronization partner setting policy storage unit 195 is an example of priority order information, and the priority determining unit 17 is an example of a priority determining unit. The electronic information board 2α used as the synchronization source is an example of a first electronic apparatus, and the electronic information board 2 used as the synchronization partner is an example of a second electronic apparatus in this description. Further, the electronic information board 2 used as the synchronization partner can be used as an electronic apparatus, and the electronic information board 2α used as the synchronization source can be used as another electronic apparatus in this description.

Conventionally, it is difficult to set the configuration information intended by the administrator to an electronic apparatus. For example, the administrator may set the configuration information that enables easy operation for users, but the administrator may feel difficulty to confirm which configuration information is actually set as the effective configuration information. For example, if a user changes the configuration information of the electronic apparatus using the UI setting, and then the electronic apparatus receives new configuration information from another electronic apparatus using the synchronization setting, the new configuration information is applied to the electronic apparatus. In this case, even when the user is to operate the electronic apparatus using the configuration information set by the UI setting, the electronic apparatus may not be operated in a way that the user is intended to operate.

As to the above described embodiments, the communication system can easily apply the intended configuration information.

Each of the functions of the above described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. A communication system comprising:
    a first electronic apparatus; and
    a second electronic apparatus communicable with the first electronic apparatus;
    wherein the first electronic apparatus includes first circuitry configured to transmit first configuration information stored in a first memory of the first electronic apparatus to the second electronic apparatus at a given timing, and
    wherein the second electronic apparatus includes second circuitry, including a plurality of information reception interfaces including at least a first information reception interface and a second information reception interface, the second circuitry configured to
    receive the first configuration information from the first electronic apparatus via the first information reception interface;
    receive second configuration information via the second information reception interface;
    refer to priority information indicating a priority order set for the first information reception interface and the second information reception interface; and
    determine which of the first configuration information received from the first electronic apparatus via the first information reception interface and the second configuration information received via the second information reception interface is to be discarded or stored in a second memory of the second electronic apparatus based on the priority order set for the first information reception interface and the second information reception interface.

2. The communication system of claim 1,
    wherein the priority information sets the first information reception interface with a lower priority order, and the second information reception interface with a higher priority order, and
    wherein when the second circuitry receives the second configuration information via the second information reception interface set with the higher priority order after receiving the first configuration information via the first information reception interface set with the lower priority order, the second circuitry stores the second configuration information received via the second information reception interface set with the higher priority order in the second memory, and
    wherein when the second circuitry receives the first configuration information via the first information reception interface set with the lower priority order after receiving the second configuration information via the second information reception interface set with the higher priority order, the second circuitry discards the first configuration information received via the first information reception interface set with the lower priority order.

3. The communication system of claim 2,
    wherein the priority information includes a flag indicating whether the second circuitry receives or does not receive the first configuration information via the first information reception interface and the second configuration information via the second information reception interface in addition to the priority order set for the first information reception interface and the second information reception interface, and
    wherein when the second circuitry receives the first configuration information via the first information reception interface set with the lower priority order while the flag of the second information reception interface set with the higher priority order is set with false indicating that the second configuration information is not yet received at the second electronic apparatus, the second circuitry stores the first configuration information received via the first information reception interface, and
    wherein when the second circuitry receives the first configuration information via the first information reception interface set with the lower priority order while the flag of the second information reception interface set with the higher priority order is set with true indicating that the second configuration information is already received via the second information reception interface, the second circuitry discards the first configuration information received via the first information reception interface.

4. The communication system of claim 3,
    wherein the second circuitry applies any one of the first configuration information and the second configuration information stored in the second memory at a given timing to operate the second electronic apparatus, and
    wherein when the second circuitry receives the first configuration information via the first information reception interface and the second configuration information via the second information reception interface, the second circuitry applies any one of the first configuration information and the second configuration information that is received at the most-recent date to operate the second electronic apparatus.

5. The communication system of claim 4,
    wherein the plurality of the information reception interfaces further includes a third information reception interface, and
    wherein the second circuitry receives the first configuration information from the first electronic apparatus via the first information reception interface, and
    wherein the second circuitry receives the second configuration information from a user interface of the second electronic apparatus via the second information reception interface, and wherein the second circuitry receives third configuration information via the third information reception interface from a terminal apparatus communicable with the second electronic apparatus via a network.

6. The communication system of claim 5,
wherein the second circuitry stores the second configuration information received via the second information reception interface in the second memory, and applies the second configuration information to operate the second electronic apparatus.

7. The communication system of claim 5,
wherein when the second circuitry receives the first configuration information via the first information reception interface, the second configuration information via the second information reception interface, and the third configuration information via the third information reception interface while the second information reception interface and the third information reception interface are set with the higher priority order, compared to the priority order set for the first information reception interface, the second circuitry stores or discards the first configuration information depending on whether the flag of the second information reception interface and a flag of the third information reception interface are true or false, and
wherein when the second circuitry receives the first configuration information via the first information reception interface, the second configuration information via the second information reception interface, and the third configuration information via the third information reception interface while the first information reception interface and the third information reception interface are set with the higher priority order, compared to the priority order set for the second information reception interface, the second circuitry stores or discards the second configuration information depending on whether the flag of the first information reception interface and the flag of the third information reception interface are true or false, and
wherein when the second circuitry receives the first configuration information via the first information reception interface, the second configuration information via the second information reception interface, and the third configuration information via the third information reception interface while the first information reception interface and the second information reception interface are set with the higher priority order, compared to the priority order set for the third information reception interface, the second circuitry stores or discards the third configuration information depending on whether the flag of the first information reception interface and the flag of the second information reception interface are true or false.

8. A method of setting configuration information in an electronic apparatus, the method comprising:
receiving first configuration information from another electronic apparatus via a first information reception interface of the electronic apparatus;
receiving second configuration information via a second information reception interface of the electronic apparatus;
referring to priority information indicating a priority order set for the first information reception interface and the second information reception interface; and
determining which of the first configuration information received from the another electronic apparatus via the first information reception interface and the second configuration information received via the second information reception interface is to be stored in the electronic apparatus or discarded based on the priority order set for the first information reception interface and the second information reception interface.

9. An electronic apparatus comprising:
circuitry, including at least a first information reception interface and a second information reception interface, the circuitry configured to
receive, via the first information reception interface, first configuration information from another electronic apparatus configured to transmit the first configuration information at a given timing;
receive second configuration information via the second information reception interface;
refer to priority information indicating a priority order set for the first information reception interface and the second information reception interface; and
determine which of the first configuration information received from the another electronic apparatus via the first information reception interface and the second configuration information received via the second information reception interface is to be stored in the electronic apparatus or discarded based on the priority order set for the first information reception interface and the second information reception interface.

\* \* \* \* \*